United States Patent
Hakkaku et al.

(10) Patent No.: US 11,407,167 B2
(45) Date of Patent: Aug. 9, 2022

(54) THREE-DIMENSIONAL OBJECT MANUFACTURING METHOD AND THREE-DIMENSIONAL OBJECT MANUFACTURING SYSTEM

(71) Applicant: MIMAKI ENGINEERING CO., LTD., Nagano (JP)

(72) Inventors: Kunio Hakkaku, Nagano (JP); Katsuyuki Kurihara, Nagano (JP); Tetsuya Katou, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 0 days.

(21) Appl. No.: 16/596,795

(22) Filed: Oct. 9, 2019

(65) Prior Publication Data
US 2020/0130259 A1 Apr. 30, 2020

(30) Foreign Application Priority Data
Oct. 29, 2018 (JP) .............................. JP2018-202602

(51) Int. Cl.
*B29C 64/112* (2017.01)
*B29C 64/209* (2017.01)
(Continued)

(52) U.S. Cl.
CPC .......... *B29C 64/112* (2017.08); *B29C 64/209* (2017.08); *B29C 64/218* (2017.08);
(Continued)

(58) Field of Classification Search
None
See application file for complete search history.

(56) References Cited

U.S. PATENT DOCUMENTS 8,702,224 B2 * 4/2014 Ohnishi ............... B41J 11/0015
347/102
8,783,820 B2 * 7/2014 Itoh ........................ B41J 25/003
347/19

FOREIGN PATENT DOCUMENTS

| JP | 2005125787 | 5/2005 |
|----|------------|--------|
| JP | 2015212042 | 11/2015 |
| JP | 2016016553 | 2/2016 |

OTHER PUBLICATIONS

Yasumi et al., Three-Dimensional Object Molding Method and Device, English Machine Translation and Original Document of JP2016016553 (A)—Feb. 1, 2016 (Year: 2016).*

(Continued)

*Primary Examiner* — Philip C Tucker
*Assistant Examiner* — Evan T Hulting
(74) *Attorney, Agent, or Firm* — JCIPRNET

(57) ABSTRACT

In a three-dimensional object manufacturing method using a three-dimensional object manufacturing device for manufacturing a three-dimensional object by layering and stacking an ink layer in which a surface is flattened by a flattening roller for removing one part of the surface of the ink layer to adjust a thickness of the ink layer to a thickness t, where when forming ink layers with an inkjet head, an ink ejection amount reduction region in which an ejection amount of ink ejected by the inkjet head is reduced from an amount corresponding to the thickness t in a part corresponding to an interior of the three-dimensional object, and when forming the ink layers on an upper side of the specific ink layers with the inkjet head, an ejection amount of ink ejected by the inkjet head is increased from an amount corresponding to the thickness t.

13 Claims, 17 Drawing Sheets

(51) Int. Cl.
*B29C 64/393* (2017.01)
*B29C 64/218* (2017.01)
*B33Y 80/00* (2015.01)
*B33Y 30/00* (2015.01)
*B33Y 40/00* (2020.01)
*B33Y 50/02* (2015.01)
*B33Y 10/00* (2015.01)

(52) U.S. Cl.
CPC ............. *B29C 64/393* (2017.08); *B33Y 10/00* (2014.12); *B33Y 30/00* (2014.12); *B33Y 40/00* (2014.12); *B33Y 50/02* (2014.12); *B33Y 80/00* (2014.12)

(56) References Cited

OTHER PUBLICATIONS

"Office Action of Japan Counterpart Application" with English translation thereof, dated Apr. 20, 2022, p. 1-p. 12.

* cited by examiner

THREE-DIMENSIONAL OBJECT MANUFACTURING METHOD AND THREE-DIMENSIONAL OBJECT MANUFACTURING SYSTEM

CROSS REFERENCE TO RELATED APPLICATIONS

This application claims the priority benefit of Japanese Patent Application No. 2018-202602, filed on Oct. 29, 2018. The entirety of the above-mentioned patent application is hereby incorporated by reference herein and made a part of this specification.

TECHNICAL FIELD

The present disclosure relates to a three-dimensional object manufacturing method and a three-dimensional object manufacturing system for manufacturing a three-dimensional object.

DESCRIPTION OF THE BACKGROUND ART

As a conventional three-dimensional object manufacturing system, that which layers and stacks ink layers formed by ink to ultimately manufacture the entire three-dimensional object is known (see e.g., Japanese Unexamined Patent Publication No. 2016-016553 (Patent Literature 1)). The conventional three-dimensional object manufacturing system forms an uncured ink layer by ejecting ink with an inkjet head, and then flattens the surface of the ink layer with a flattening roller to remove the excessive ink and align the thickness of the ink layer to a specific thickness. The excessive ink removed from the ink layer by the flattening roller is discarded.

Patent Literature 1: Japanese Unexamined Patent Publication No. 2016-016553

SUMMARY

However, in the conventional three-dimensional object manufacturing system, the excess ink removed from the ink layer by the flattening roller, that is, the discarded amount of ink is a large amount, for example, an amount of 10% to 30% of the ink ejected by the inkjet head.

The present disclosure provides a three-dimensional object manufacturing method and a three-dimensional object manufacturing system capable of reducing the amount of ink removed from the ink layer, that is, the discarded amount of ink compared to the conventional art.

A three-dimensional object manufacturing method of the present disclosure relates to a three-dimensional object manufacturing method provides a three-dimensional object manufacturing device including: an inkjet head for forming an ink layer; a flattening mechanism for removing one part of a surface of the ink layer formed by the inkjet head to flatten the surface and adjust a thickness of the ink layer to a specific thickness; and a controller for layering and stacking the ink layer in which the surface is flattened by the flattening mechanism to manufacture a three-dimensional object. The three-dimensional object manufacturing method includes: an ink ejection amount reducing step of forming an ink ejection amount reduction region in which an ejection amount of ink ejected by the inkjet head is reduced from an amount corresponding to the specific thickness in at least one part of a part corresponding to an interior of the three-dimensional object, when forming the specific ink layer with the inkjet head; and an ink ejection amount increasing step of increasing an ejection amount of ink ejected by the inkjet head with respect to a region in which a range in an extending direction of the ink layer overlaps the ink ejection amount reduction region from an amount corresponding to the specific thickness, when forming the ink layer on an upper side of the specific ink layer with the inkjet head.

According to such a configuration, when forming a specific ink layer by the inkjet head, the three-dimensional object manufacturing method of the present disclosure forms the ink ejection amount reduction region in which the ejection amount of ink ejected by the inkjet head is reduced from the amount corresponding to the specific thickness, and hence the ink is not removed by the flattening mechanism with respect to the ink ejection amount reduction region when adjusting the thickness of the specific ink layer to the specific thickness t by the flattening mechanism. Therefore, the three-dimensional object manufacturing method of the present disclosure can reduce the amount of ink removed from the ink layer, that is, the discarded amount of ink as compared with the conventional art.

In the three-dimensional object manufacturing method of the present disclosure, the ink ejection amount reducing step may be a step of forming the ink ejection amount reduction region by forming cavity data in at least one part of a part corresponding to the ink ejection amount reduction region in manufacturing data used by the three-dimensional object manufacturing device.

According to such a configuration, the three-dimensional object manufacturing method of the present disclosure forms the ink ejection amount reduction region by forming the cavity data in at least one part of a part corresponding to the ink ejection amount reduction region in the manufacturing data used by the three-dimensional object manufacturing device, and thus can easily generate the manufacturing data for forming the ink ejection amount reduction region.

In the three-dimensional object manufacturing method of the present disclosure, the three-dimensional object may include a target shaped object to be aimed, the target shaped object may include a color layer to be visually recognized from an outside, and the ink ejection amount reduction region may be disposed on an inner side of the color layer in the target shaped object.

According to such a configuration, the three-dimensional object manufacturing method of the present disclosure disposes the ink ejection amount reduction region on the inner side of the color layer of the surface region in the target shaped object, and thus the ejection amount of ink with respect to the color layer of the target shaped object can be suppressed from reducing in forming the ink layer, and as a result, the color quality of the target shaped object can be suppressed from degrading.

In the three-dimensional object manufacturing method of the present disclosure, the three-dimensional object may include a target shaped object to be aimed, and a support portion for supporting at least one part of the target shaped object, and the ink ejection amount reducing step may be a step of forming the ink ejection amount reduction region in at least one part of the support portion.

According to such a configuration, the three-dimensional object manufacturing method of the present disclosure forms the ink ejection amount reduction region in at least one part of the support portion which is often larger in volume than the target shaped object, and hence the amount of ink removed from the ink layer, that is, the discarded amount of ink can be effectively reduced.

In the three-dimensional object manufacturing method of the present disclosure, the ink ejection amount reducing step may be a step of forming a plurality of the ink ejection amount reduction regions in the three-dimensional object in an extending direction of the ink layer.

According to such a configuration, the three-dimensional object manufacturing method of the present disclosure forms a plurality of ink ejection amount reduction regions in the three-dimensional object in the extending direction of the ink layer, and thus the deformation and warpage of the ink layer in the layering direction of the ink layer can be suppressed by the ink ejection amount reduction regions, and as a result, the accuracy in the shape of the three-dimensional object can be enhanced.

A three-dimensional object manufacturing system of the present disclosure relates to a three-dimensional object manufacturing system includes: a three-dimensional object manufacturing device including: an inkjet head for forming an ink layer; a flattening mechanism for removing one part of a surface of the ink layer formed by the inkjet head to flatten the surface and adjust a thickness of the ink layer to a specific thickness; and a controller for layering and stacking the ink layer in which the surface is flattened by the flattening mechanism to manufacture a three-dimensional object. The controller is configured to form an ink ejection amount reduction region in which an ejection amount of ink ejected by the inkjet head is reduced from an amount corresponding to the specific thickness in at least one part of a part corresponding to an interior of the three-dimensional object when forming the specific ink layer with the inkjet head, and increase an ejection amount of ink ejected by the inkjet head with respect to a region in which a range in an extending direction of the ink layer overlaps the ink ejection amount reduction region from an amount corresponding to the specific thickness when forming the ink layer on an upper side of the specific ink layer with the inkjet head.

According to such a configuration, when forming a specific ink layer by the inkjet head, the three-dimensional object manufacturing system of the present disclosure forms the ink ejection amount reduction region in which the ejection amount of ink ejected by the inkjet head is reduced from the amount corresponding to the specific thickness, and hence the ink is not removed by the flattening mechanism with respect to the ink ejection amount reduction region when adjusting the thickness of the specific ink layer to the specific thickness t by the flattening mechanism. Thus, the three-dimensional object manufacturing system of the present disclosure can reduce the amount of ink removed from the ink layer, that is, the discarded amount of ink, as compared with the conventional art.

The three-dimensional object manufacturing method and the three-dimensional object manufacturing system of the present disclosure can reduce the amount of ink removed from the ink layer, that is, the discarded amount of ink, as compared with the conventional art.

DESCRIPTION OF EMBODIMENTS

Hereinafter, one embodiment of the present disclosure will be described with reference to the drawings.

First, a configuration of a three-dimensional object manufacturing system according to one embodiment of the present disclosure will be described.

Figure 1:
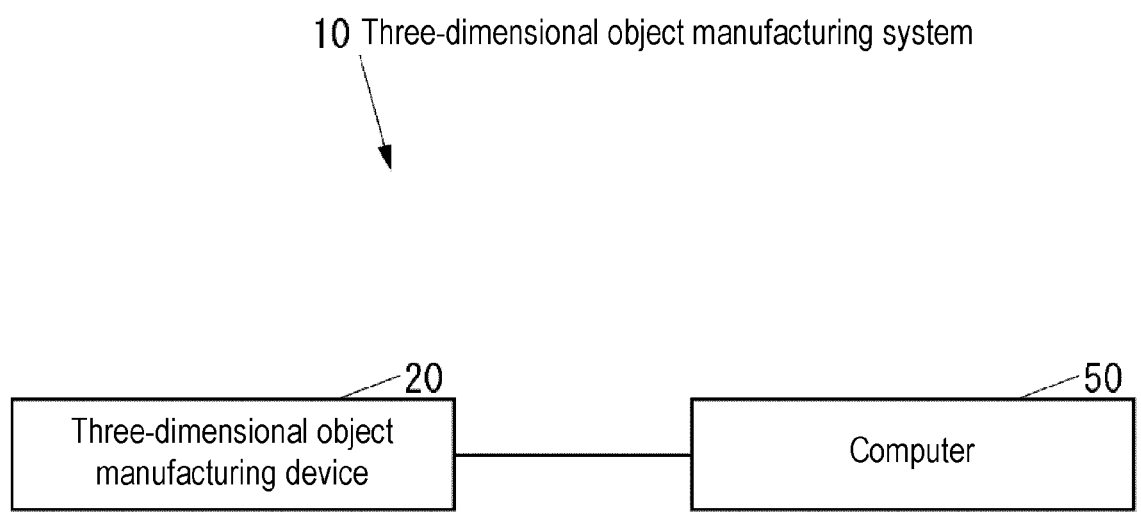
FIG. 1 is a block diagram of a three-dimensional object manufacturing system according to one embodiment of the present disclosure.

FIG. 1 is a block diagram of a three-dimensional object manufacturing system 10 according to the present embodiment.

As shown in FIG. 1, the three-dimensional object manufacturing system 10 includes: a three-dimensional object manufacturing device 20 for manufacturing a three-dimensional object, and a computer 50 such as a personal computer (PC) for transmitting manufacturing data of the three-dimensional object to the three-dimensional object manufacturing device 20.

Here, the three-dimensional object manufactured by the three-dimensional object manufacturing system 10 includes: a target shaped object to be aimed, and a support portion for supporting at least one part of the target shaped object at the time of manufacturing the target shaped object. However, the three-dimensional object manufactured by the three-dimensional object manufacturing system 10 may not include the support portion if the support portion is unnecessary. The support portion is formed by a substance that can be easily removed from the target shaped object after manufacturing of the three-dimensional object, such as a substance that can be removed by a specific liquid, such as water.

The three-dimensional object manufacturing device 20 and the computer 50 are communicably connected directly in a wired or wireless manner through a network such as a local area network (LAN), the Internet, or the like or without the network.

Figure 2:
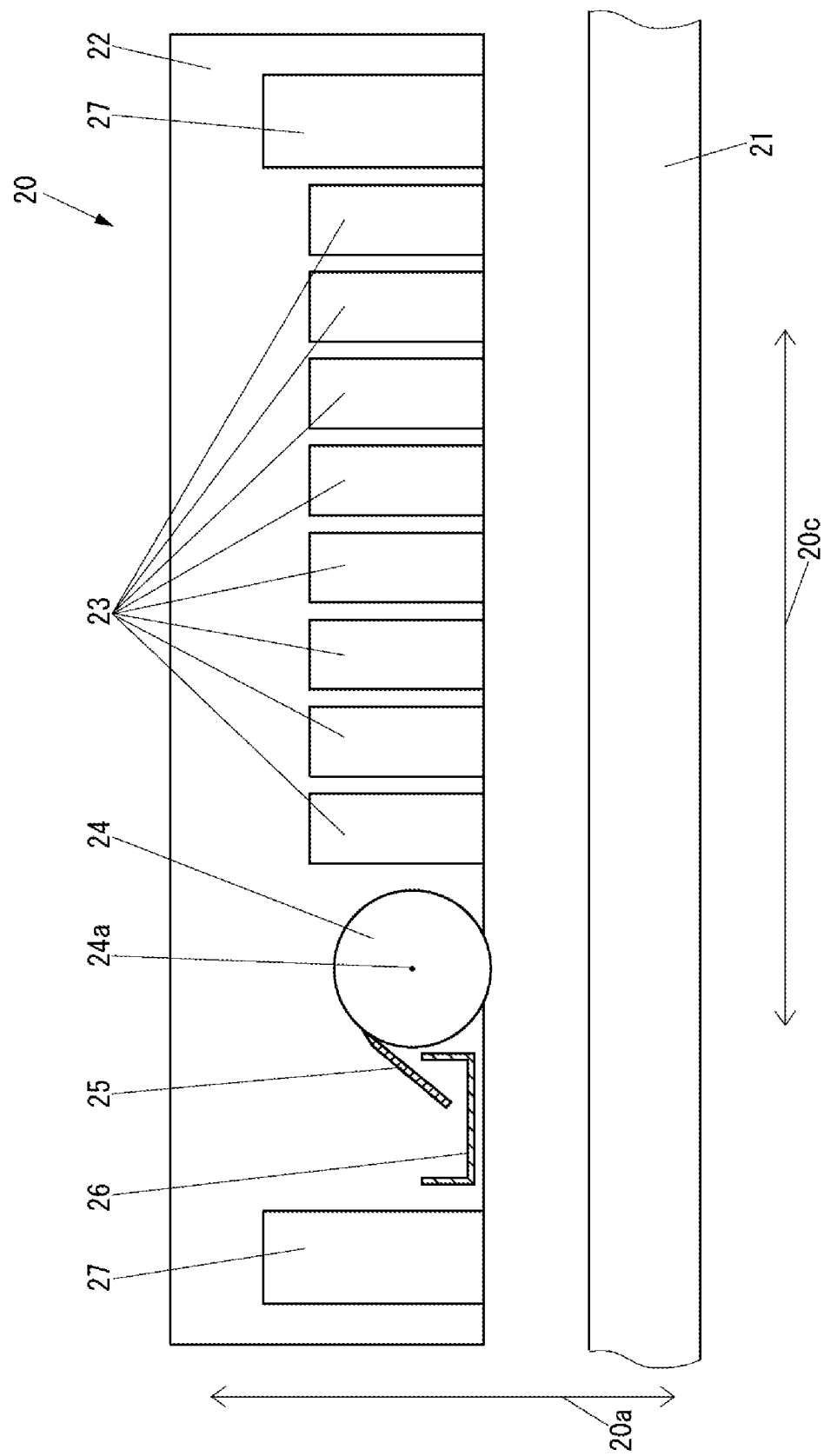
FIG. 2 is a schematic front view of one part of the three-dimensional object manufacturing device shown in FIG. 1.
Figure 3:
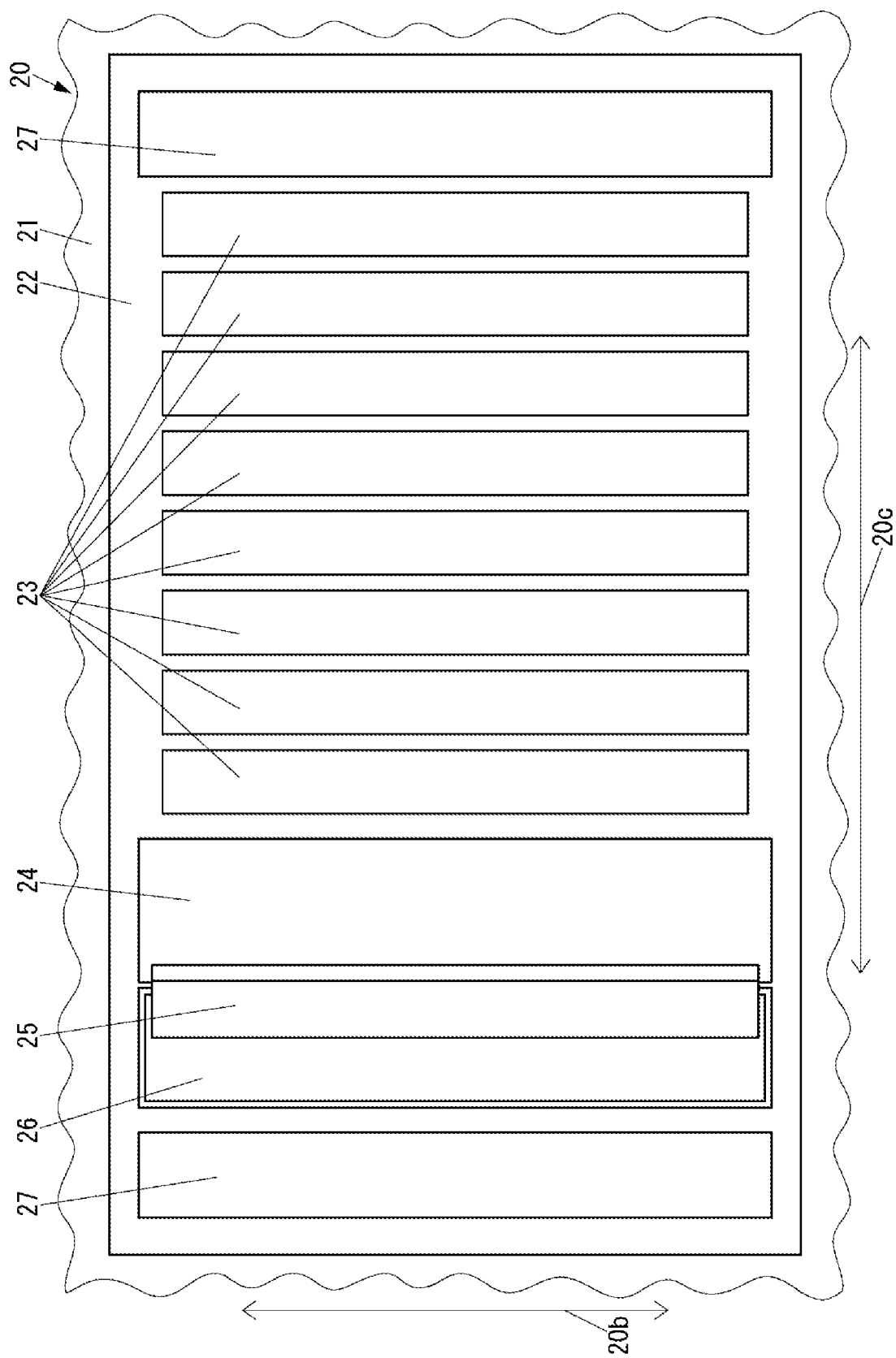
FIG. 3 is a schematic plan view of one part of the three-dimensional object manufacturing device shown in FIG. 2.

FIG. 2 is a schematic front view of one part of the three-dimensional object manufacturing device 20. FIG. 3 is a schematic plan view of one part of the three-dimensional object manufacturing device 20.

As shown in FIG. 2 and FIG. 3, the three-dimensional object manufacturing device 20 includes: a shaping table 21 that serves as a table of a three-dimensional object when the three-dimensional object is manufactured, a carriage 22 that is disposed on an upper side of the shaping table 21 in a vertical direction indicated with an arrow 20a, a plurality of inkjet heads 23 that form an ink layer by ejecting an ultraviolet-curable ink toward the lower side in the vertical direction, a flattening roller 24 serving as a flattening mechanism that flattens the surface of the ink layer by removing one part on the surface of the ink layer formed by the inkjet heads 23 to adjust the thickness of the ink layer to a specific thickness t, a blade 25 that scrapes off the ink removed by the flattening roller 24, that is, the waste ink from the flattening roller 24, a waste ink receiver 26 serving as a receiving tray that receives the waste ink scraped off by the blade 25 from the flattening roller 24, and a plurality of ultraviolet irradiators 27 that irradiate an ultraviolet light toward the ink layer flattened by the flattening roller 24. The three-dimensional object manufacturing device 20 is a device that layers and stacks ink layers formed by ink to ultimately manufacture the entire three-dimensional object.

The carriage 22 is mounted with the plurality of inkjet heads 23, the flattening roller 24, the blade 25, the waste ink receiver 26, and the plurality of ultraviolet irradiators 27.

The inkjet head 23 ejects ink from a plurality of nozzles (not shown) lined in a front and back direction indicated by an arrow 20b orthogonal to the vertical direction. The plurality of inkjet heads 23 can eject inks of different types from each other. For example, the three-dimensional object manufacturing device 20 includes an inkjet head 23 that ejects cyan ink, an inkjet head 23 that ejects magenta ink, an inkjet head 23 that ejects yellow ink, an inkjet head 23 that ejects black ink, an inkjet head 23 that ejects white ink, an inkjet head 23 that ejects transparent ink, an inkjet head 23 that ejects ink for forming the interior of a target shaped object, and an inkjet head 23 that ejects ink for forming the support portion. The ink for forming the interior of the target shaped object may be any ink and may be, for example, a white ink. Furthermore, the ink for forming the support portion is an ink that can be easily removed after curing.

The flattening roller 24 is extended in the front and back direction, and is mounted on the carriage 22 to be rotatable about a center axis 24a extending in the front and back direction.

The blade 25, the waste ink receiver 26, and the ultraviolet irradiator 27 are respectively extended in the front and the back direction.

Figure 4:
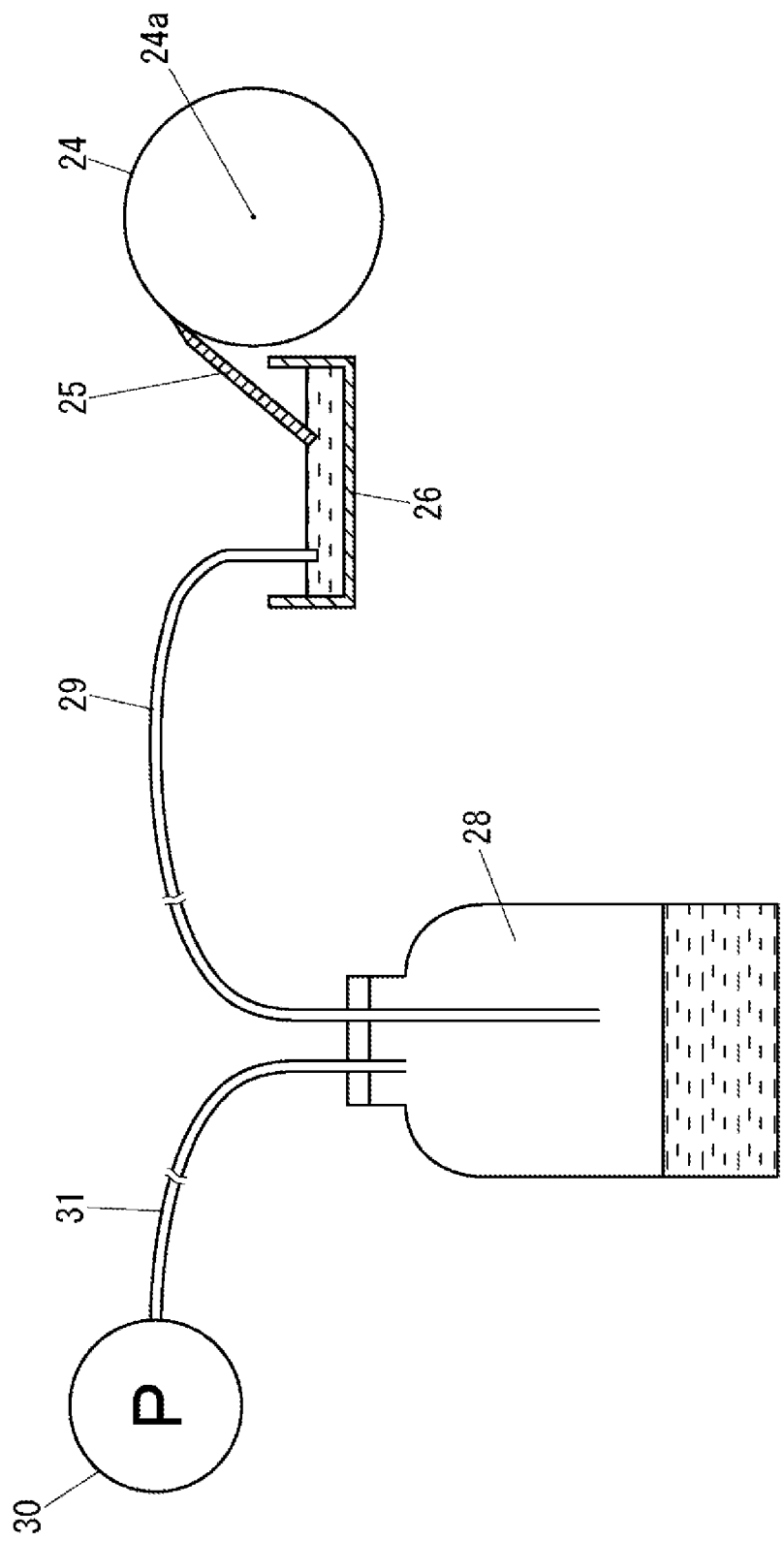
FIG. 4 is a schematic configuration view of a waste ink collecting mechanism in the three-dimensional object manufacturing device shown in FIG. 2.

FIG. 4 is a schematic configuration view of a waste ink collecting mechanism in the three-dimensional object manufacturing device 20.

As shown in FIG. 4, the three-dimensional object manufacturing device 20 includes: a waste ink bottle 28 that accumulates waste ink, a tube 29 that communicates the interior of the waste ink receiver 26 and the interior of the waste ink bottle 28, a suction pump 30 that suctions air from the waste ink bottle 28 to suction the waste ink accumulated in the waste ink receiver 26 from the side of the waste ink bottle 28 and decompress the interior of the waste ink bottle 28, and a tube 31 that communicates the interior of the waste ink bottle 28 and the suction pump 30.

The waste ink bottle 28 and the suction pump 30 are not mounted on the carriage 22.

Figure 5:
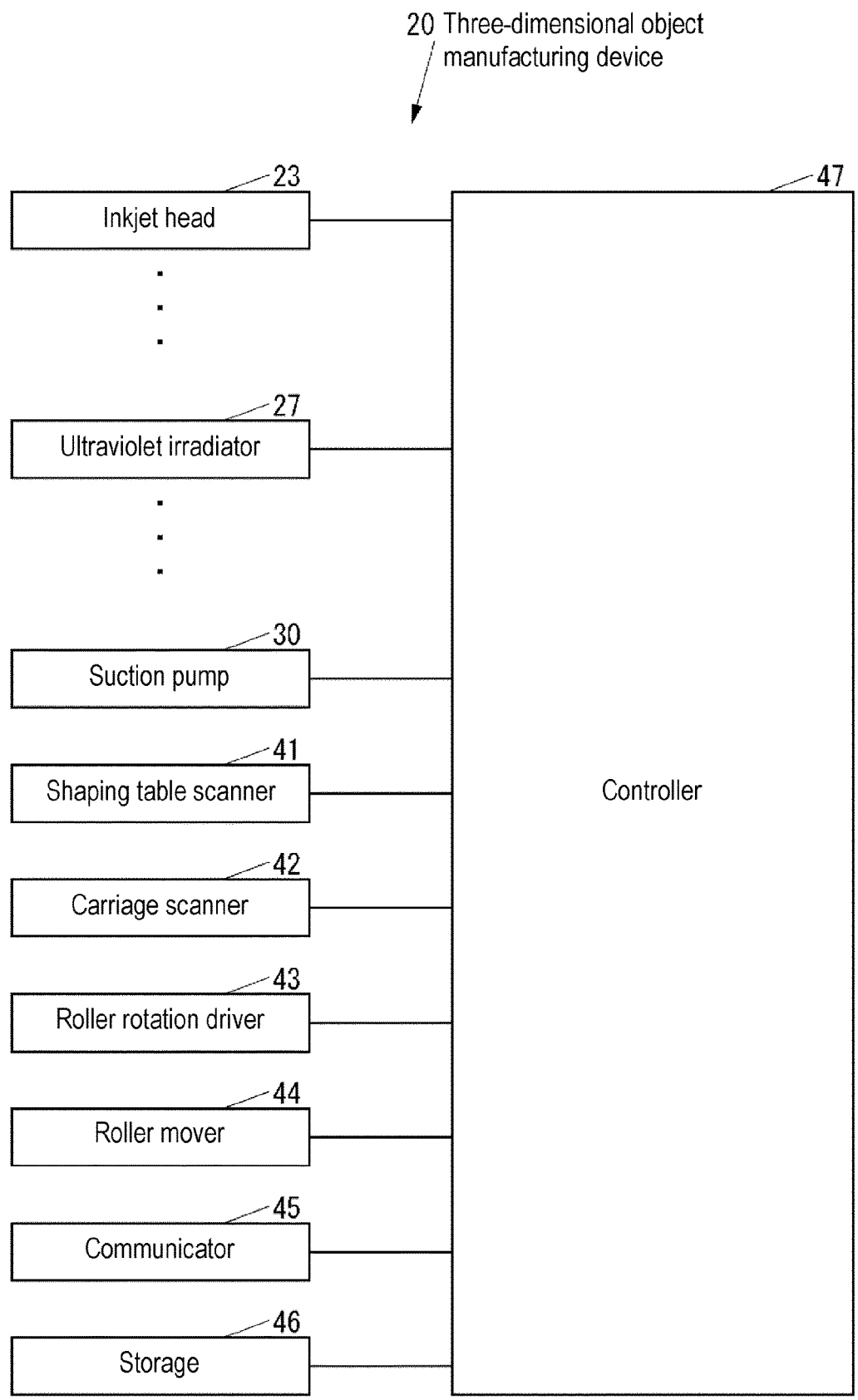
FIG. 5 is a block diagram of the three-dimensional object manufacturing device shown in FIG. 2.

FIG. 5 is a block diagram of the three-dimensional object manufacturing device 20.

As shown in FIG. 5, the three-dimensional object manufacturing device 20 includes: the plurality of inkjet heads 23, the plurality of ultraviolet irradiators 27, the suction pump 30, a shaping table scanner 41 that moves the shaping table 21, a carriage scanner 42 that moves the carriage 22, a roller rotation driver 43 that rotates the flattening roller 24 about a center axis 24a of the flattening roller 24, a roller mover 44 that moves the flattening roller 24, a communicator 45 which is a communication device that communicates with an external device directly in a wired or wireless manner through a network or without a network, a storage 46 which is a nonvolatile storage device such as a semiconductor memory, hard disk drive (HDD) and the like for storing various types of information, and a controller 47 that controls the entire three-dimensional object manufacturing device 20.

The shaping table scanner 41 can move the shaping table 21 in the vertical direction.

The carriage scanner 42 can move the carriage 22 in a left and right direction indicated with an arrow 20c (see FIG. 2) orthogonal to both the vertical direction and the front and back direction.

The roller mover 44 moves the flattening roller 24 in the vertical direction, lowers at the time of flattening and performs the flattening, and rises at the time of non-flattening and does not perform the flattening.

The controller 47 includes, for example, a central processing unit (CPU), a read only memory (ROM) that stores programs and various data, and a random access memory (RAM) used as a work area of the CPU. The CPU executes the program stored in the ROM or the storage 46.

Figure 6:
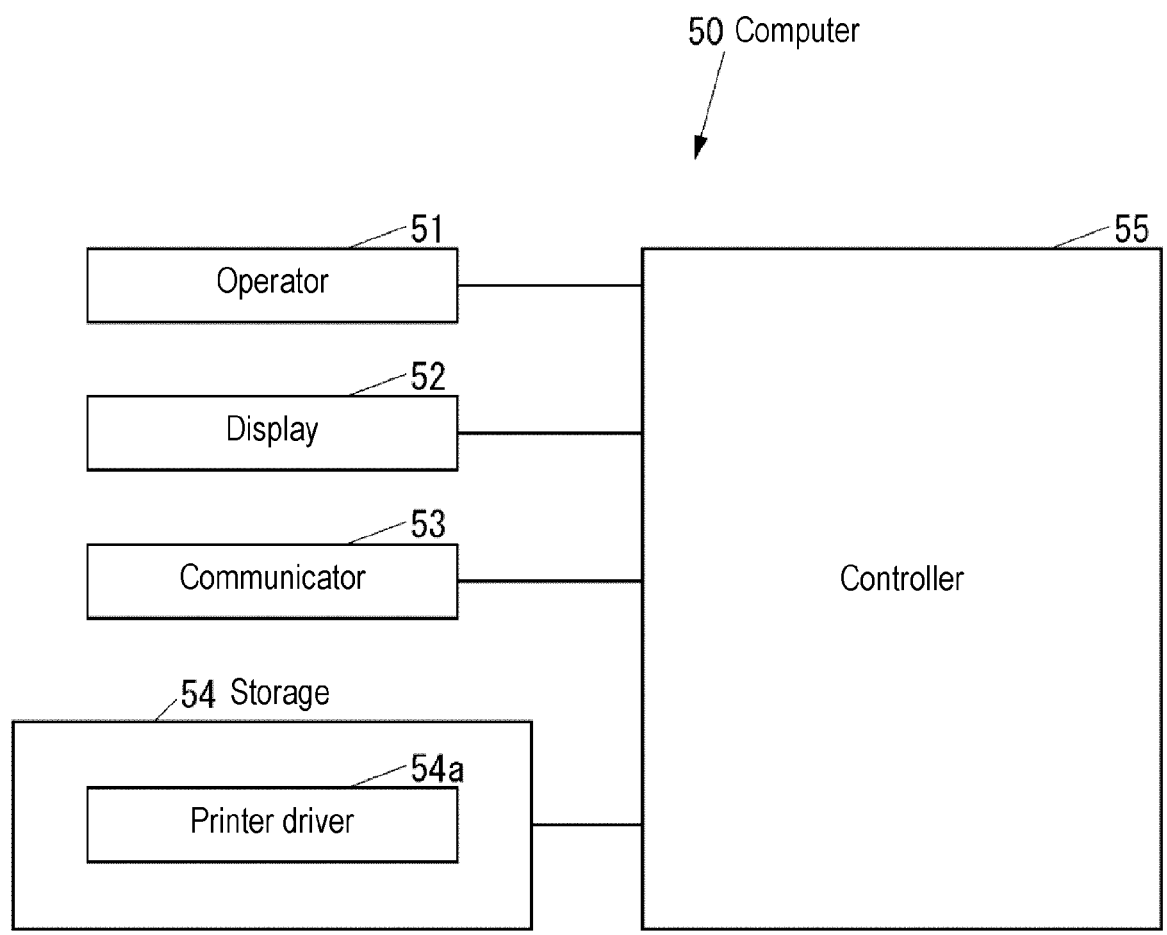
FIG. 6 is a block diagram of a computer shown in FIG. 1.

FIG. 6 is a block diagram of the computer 50.

As shown in FIG. 6, the computer 50 includes: an operator 51 which is an input device such as a keyboard and a mouse to which various operations are input, a display 52 which is a display device such as a liquid crystal display (LCD) that displays various information, a communicator 53 which is a communication device that communicates with an external device directly in a wired or wireless manner through a network or without a network, a storage 54 which is a nonvolatile storage device such as a semiconductor memory and an HDD that stores various information, and a controller 55 that controls the entire computer 50.

The storage 54 stores a printer driver 54a that controls the three-dimensional object manufacturing device 20. For example, the printer driver 54a may be installed in the computer 50 at the time of manufacturing of the computer 50, may be additionally installed in the computer 50 from an external storage medium such as a Universal Serial Bus (USB) memory, a Compact Disk (CD), or a Digital Versatile Disk (DVD), or may be additionally installed in the computer 50 from the network.

Next, the operation of the three-dimensional object manufacturing system 10 will be described.

First, the operation of the three-dimensional object manufacturing system 10 in a case of manufacturing a three-dimensional object will be described.

The user can instruct the computer 50 through the operator 51 of the computer 50 to cause the three-dimensional object manufacturing device 20 to execute the manufacturing of a three-dimensional object based on three-dimensional data of the three-dimensional object. When instructed to cause the three-dimensional object manufacturing device 20 to execute the manufacturing of a three-dimensional object based on the three-dimensional data of the three-dimensional object, the controller 55 of the computer 50 generates manufacturing data of the three-dimensional object by the printer driver 54a based on the three-dimensional data and transmits the generated manufacturing data to the three-dimensional object manufacturing device 20 through the communicator 53.

The manufacturing data of the three-dimensional object is data obtained by adding the necessary support portion to the target shaped object when the support portion for supporting the target shaped object is necessary at the time of manufacturing of the target shaped object. Furthermore, the manufacturing data of the three-dimensional object is data obtained by dividing the three-dimensional object in the vertical direction by a layer of a specific thickness.

When receiving the manufacturing data through the communicator 45, the controller 47 of the three-dimensional object manufacturing device 20 manufactures the three-dimensional object based on the received manufacturing data. Specifically, the controller 47 eventually manufactures the entire three-dimensional object by layering and stacking the ink layers formed by the ink.

Here, the operation of the three-dimensional object manufacturing device 20 in a case of forming one ink layer will be described.

First, the controller 47 controls the inkjet head 23 to ejects the ink while controls the carriage scanner 42 to move the carriage 22 in the left and right direction based on the manufacturing data, so as to form uncured ink layer on the shaping table 21 or on the ink layer on the shaping table 21.

Figure 7:
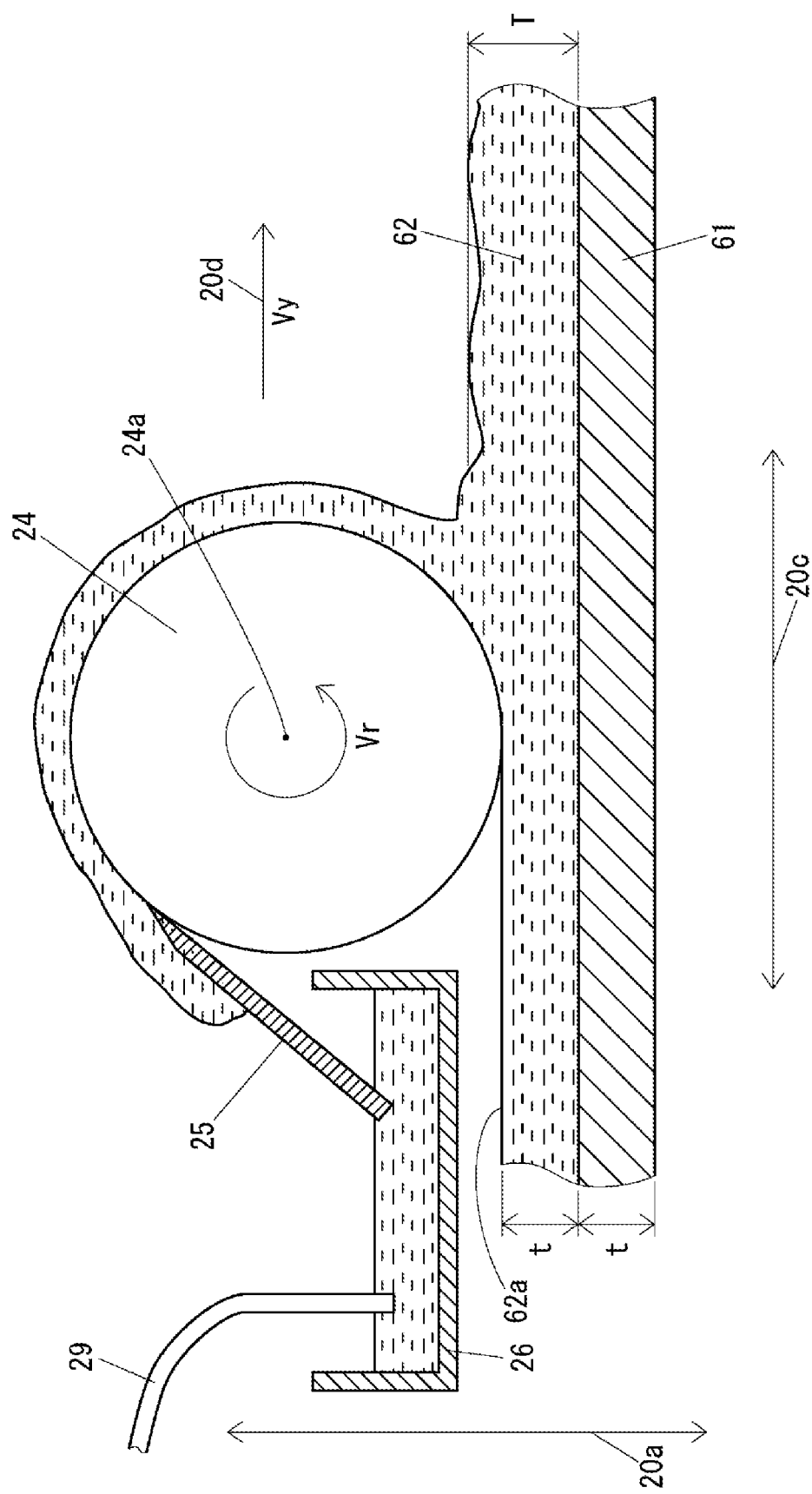
FIG. 7 is a front view of the vicinity of the flattening roller shown in FIG. 2 in a case of flattening the surface of the uncured ink layer.

The controller 47 controls the roller rotation driver 43 to rotate the flattening roller 24 while controls the carriage scanner 42 to move the carriage 22 in the left and right direction after the ink layer is formed by the inkjet head 23, thus flattening the surface of the uncured ink layer with the flattening roller 24. FIG. 7 is a front view of the vicinity of the flattening roller 24 in a case of flattening the surface of the uncured ink layer. In FIG. 7, a cured ink layer 61 and an uncured ink layer 62 formed on the ink layer 61 are shown. The ink layer 61 has a thickness t. The ink layer 62 has a thickness T greater than or equal to the thickness t before flattening by the flattening roller 24, and has a thickness t after flattening by the flattening roller 24. Therefore, the uncured ink of thickness (T−t) becomes a waste ink by flattening. In FIG. 7, the flattening roller 24 is moved at a velocity Vy in the direction indicated by the arrow 20d in the left and right direction according to the movement of the carriage 22 by the carriage scanner 42. Furthermore, in FIG. 7, the flattening roller 24 is rotated by the roller rotation driver 43 at a peripheral speed Vr greater than or equal to the velocity Vy. The movement of the carriage 22 by the carriage scanner 42 for the flattening of the ink layer by the flattening roller 24 may also be the movement of the carriage 22 by the carriage scanner 42 for the formation of the ink layer by the inkjet head 23.

The controller 47 controls the ultraviolet irradiator 27 to irradiate the ultraviolet light toward the uncured ink layer while controls the carriage scanner 42 to move the carriage 22 in the left and right direction after the ink layer is flattened by the flattening roller 24, so as to cure the uncured ink layer. The movement of the carriage 22 by the carriage scanner 42 for the irradiation of the ultraviolet light by the ultraviolet irradiator 27 may also be the movement of the carriage 22 by the carriage scanner 42 for the flattening of the ink layer by the flattening roller 24.

As described above, the three-dimensional object manufacturing device 20 forms a part of a specific range in the front and back direction of the current target ink layer.

Note that, after forming a part of a specific range in the front and back direction of the current target ink layer, if a part not yet formed exists in the front and back direction of the current target ink layer, the controller 47 repeats the operation of "moving the carriage 22 in the front and back direction by the carriage scanner 42, and then executing the formation of the cured ink layer by the inkjet head 23, the flattening of the uncured ink layer by the flattening roller 24, and the formation of the cured ink layer by the ultraviolet irradiator 27 in order" until a part not yet formed no longer exists in the front and back direction of the current target ink layer.

As described above, the three-dimensional object manufacturing device 20 forms one ink layer.

For example, if a new ink layer needs to be formed after forming one ink layer, the controller 47 controls the shaping table scanner 41 to move the shaping table 21 toward the lower side in the vertical direction by one ink layer.

Note that, in cases other than a case where the surface of the uncured ink layer is flattened by the flattening roller 24, the controller 47 controls the roller mover 44 to move the flattening roller 24 toward the upper side in the vertical direction by greater than or equal to a thickness T of at least one ink layer, so as to prevent the flattening roller 24 from coming into contact with the ink layer.

Next, the operation of the three-dimensional object manufacturing device 20 when collecting waste ink will be described.

As shown in FIG. 7, the ink removed from the ink layer by the flattening roller 24, that is, the waste ink, is scraped off from the flattening roller 24 by the blade 25, and then accumulated in the waste ink receiver 26.

Then, the controller 47 of the three-dimensional object manufacturing device 20 controls the suction pump 30 to suction air from the waste ink bottle 28 at a specific timing to decompress the interior of the waste ink bottle 28, so that the waste ink accumulated in the waste ink receiver 26 is collected in the waste ink bottle 28.

The user replaces the waste ink bottle 28, for example, when the waste ink is accumulated in the waste ink bottle 28 to a specific extent.

Hereinafter, specific examples of the three-dimensional object manufactured by the three-dimensional object manufacturing device 20 will be described.

Figure 8:
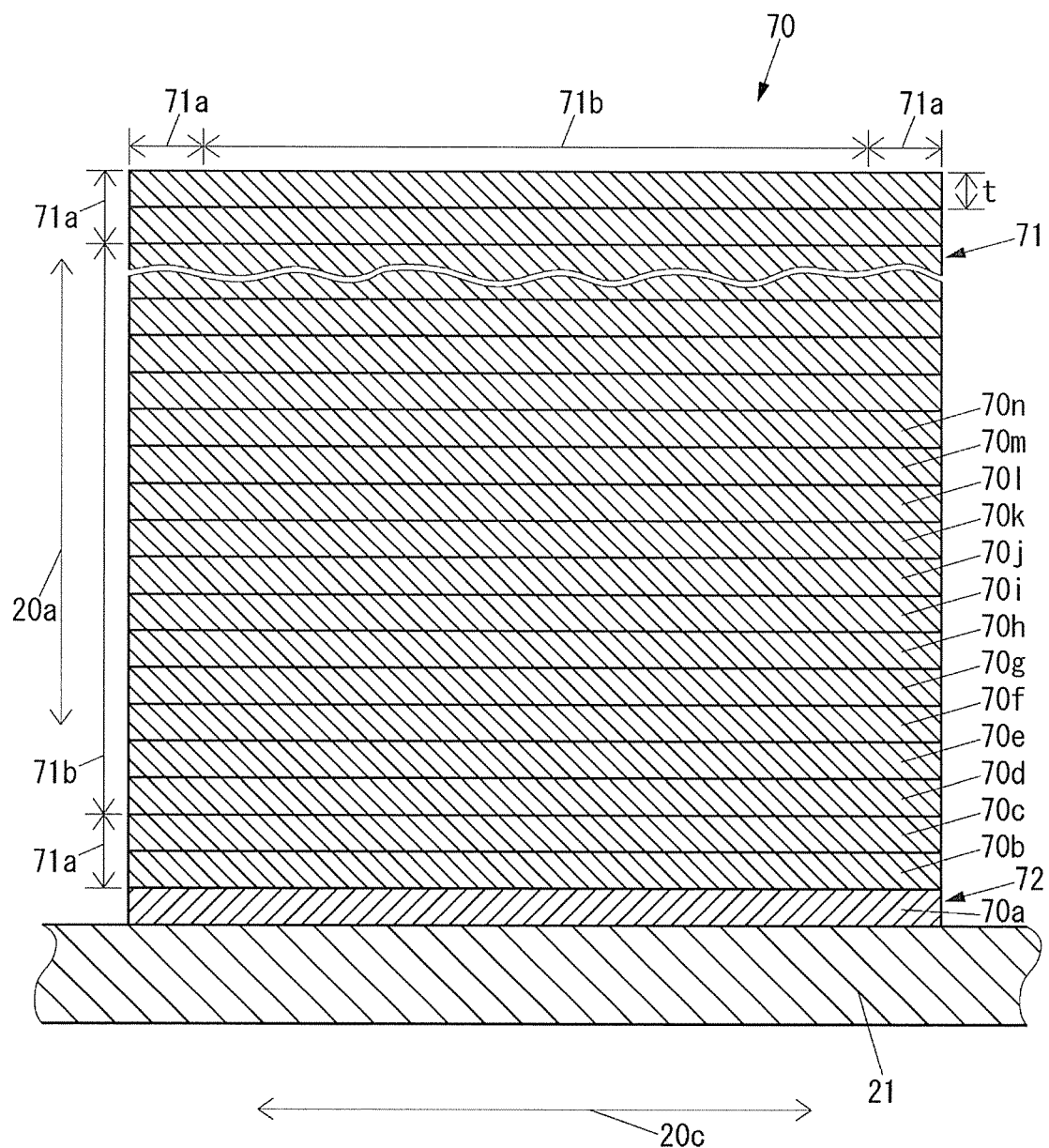
FIG. 8 is a front cross-sectional view of an example of a three-dimensional object manufactured through a conventional three-dimensional object manufacturing method by the three-dimensional object manufacturing device shown in FIG. 2.
Figure 9:
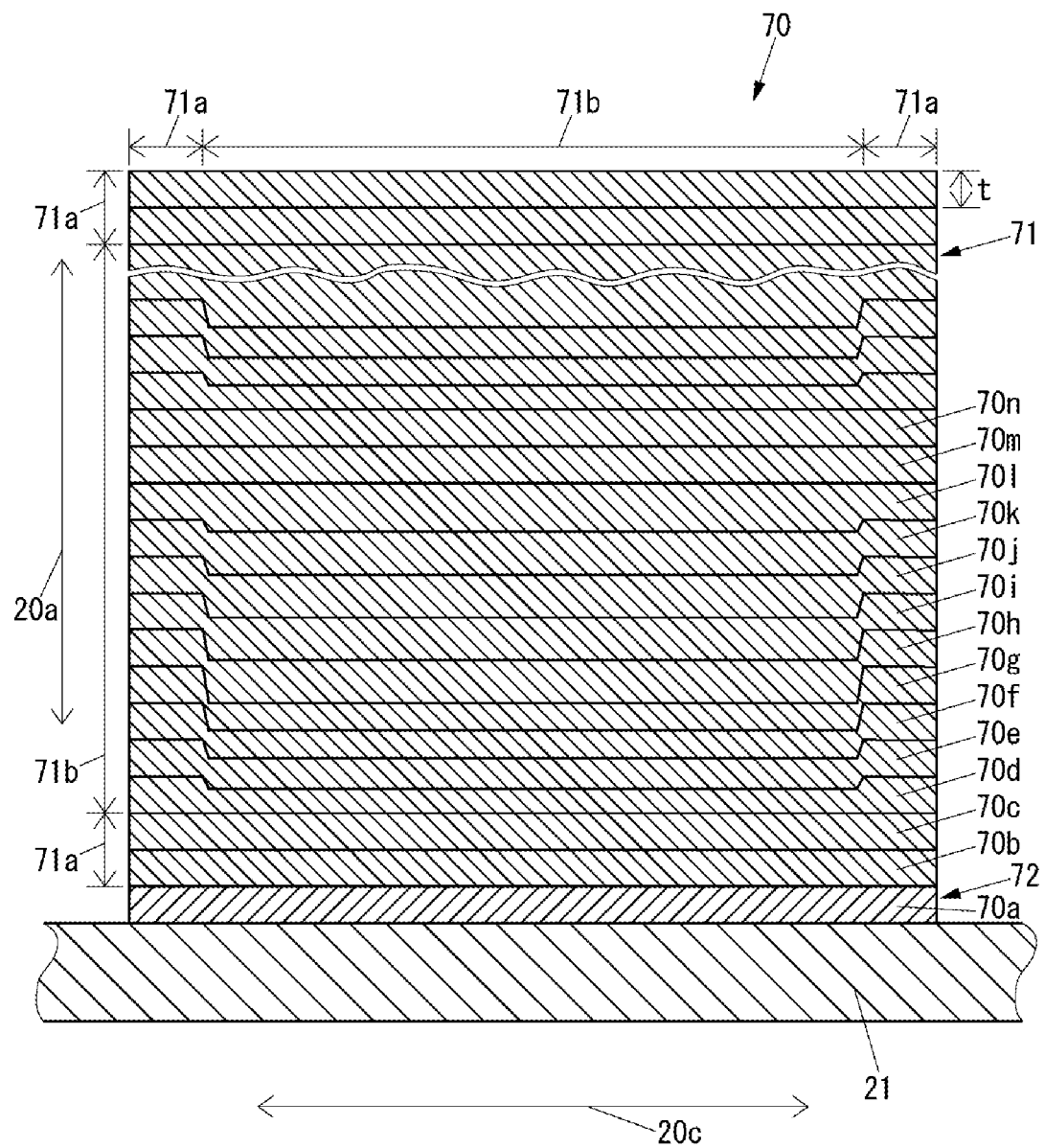
FIG. 9 is a front cross-sectional view of the three-dimensional object shown in FIG. 8 manufactured by the three-dimensional object manufacturing device by reducing the ejection amount of ink with respect to one part of the ink layer of one part by 25% from the amount corresponding to the thickness t through the three-dimensional object manufacturing method of the present disclosure.

FIG. 8 is a front cross-sectional view of a three-dimensional object 70 manufactured by the three-dimensional object manufacturing device 20 through the conventional three-dimensional object manufacturing method. FIG. 9 is a front cross-sectional view of the three-dimensional object 70 manufactured by the three-dimensional object manufacturing device 20 by reducing the ejection amount of ink with respect to one part of the ink layer of one part by 25% from the amount corresponding to the thickness t through the three-dimensional object manufacturing method of the present disclosure.

In FIG. 8 and FIG. 9, the three-dimensional object 70 includes: a target shaped object 71 and a support portion 72. The three-dimensional object 70 is formed of multiple ink layers such as ink layers 70a to 70n. The thickness of each ink layer is all thickness t. The target shaped object 71 includes: a surface portion 71a serving as a part on the surface, and an interior 71b disposed on the inner side than the surface portion 71a. The thickness of the surface portion 71a in the vertical direction is a thickness of two ink layers, but may be a thickness other than the thickness of two layers. The thickness of the surface portion 71a is, for example, from 50 μm to 500 μm. FIG. 8 and FIG. 9 show front cross-sectional views of the three-dimensional object 70, but the three-dimensional object 70 has a configuration similar to the front cross-section for the side cross-section. Furthermore, although the support portion 72 is configured only on the lower surface of the target shaped object 71, it may be configured on the side surface or the upper surface of the target shaped object 71.

The printer driver 54a displays a user interface (UI) that receives an instruction to save waste ink on the display 52 of the computer 50. Then, instruction is made through the operator 51 to cause the three-dimensional object manufacturing device 20 to execute manufacturing of the three-dimensional object 70 based on the three-dimensional data of the three-dimensional object 70. When instruction is not made to save the waste ink on the UI, manufacturing data for causing the three-dimensional object manufacturing device 20 to manufacture the three-dimensional object 70 shown in FIG. 8 through the conventional three-dimensional object manufacturing method is generated. On the other hand, when instruction is made to save the waste ink on the UI, manufacturing data for causing the three-dimensional object manufacturing device 20 to manufacture the three-dimensional object 70 shown in FIG. 9 through the three-dimensional object manufacturing method of the present disclosure is generated.

In the following, as a method of increasing the ejection amount of ink ejected by the inkjet head 23 more than the amount corresponding to the thickness t regarding the ink layer, for example, a method of forming to the thickness T shown in FIG. 7 with a voltage for the inkjet head 23 to eject ink as a normal voltage and not performing flattening, a method of raising the voltage for causing the inkjet head 23 to eject ink to higher than the normal voltage, a method of causing the inkjet head 23 to eject ink of a dot larger than the normal dot by a dot size control, and a method of making, regarding the data (hereinafter referred to as "ink data") corresponding to the number of droplets per unit area of the ink ejected by the inkjet head 23, the number of ink data to a number exceeding 100% when the number of ink data corresponding to the thickness t is 100% can be adopted. Furthermore, as a method of reducing the ejection amount of ink ejected by the inkjet head 23 from the amount corresponding to the thickness t regarding the ink layer, for example, a method of lowering the voltage for causing the inkjet head 23 to eject ink to lower than the normal voltage, a method of causing the inkjet head 23 to eject ink of a dot smaller than the normal dot by a dot size control, and a method of decimating the ink data in three-dimensional directions 20a, 20b, 20c to make the number of ink data to less than 100% when the number of ink data corresponding to the thickness t is 100% can be adopted.

First, a method of manufacturing the three-dimensional object 70 shown in FIG. 8 in the conventional three-dimensional object manufacturing method will be described.

The controller 47 increases the ejection amount of ink ejected by the inkjet head 23 by 20% from the amount corresponding to the thickness t to obtain thickness T for all the ink layers, and then removes the increased 20% by performing flattening with the flattening roller 24 to make the final thickness as thickness t.

Next, a method of manufacturing the three-dimensional object 70 shown in FIG. 9 in the three-dimensional object manufacturing method of the present disclosure will be described.

First, the controller 47 increases the ejection amount of ink ejected by the inkjet head 23 by 20% from the amount corresponding to the thickness t for each of the ink layers 70a to 70c, and then removes the increased 20% by performing flattening with the flattening roller 24 to make the final thickness as thickness t.

Next, for each of the ink layers 70d to 70g, the controller 47 increases the ejection amount of ink ejected by the inkjet head 23 with respect to a part corresponding to the surface portion 71a of the three-dimensional object 70 by 20% from the amount corresponding to the thickness t and reduces the ejection amount of ink ejected by the inkjet head 23 with respect to a part corresponding to the interior 71b of the three-dimensional object 70 by 25% from the amount corresponding to the thickness t, and then removes the 20% of the amount corresponding to the thickness t with respect to a part corresponding to the surface portion 71a of the three-dimensional object 70 through flattening by the flattening roller 24 to make the final thickness of the part corresponding to the surface portion 71a of the three-dimensional object 70 as thickness t. Here, since the part corresponding to the interior 71b of the three-dimensional object 70 is lower than the flattening roller 24 in the vertical direction, such a part does not come into contact with the flattening roller 24 and thus is not flattened. The part corresponding to the interior 71b of the three-dimensional object 70 in the ink layers 70d to 70g form an ink ejection amount reduction region of the present disclosure. In the four layers of the ink layers 70*d* to 70*g*, the ink that eventually forms the part corresponding to the interior 71*b* of the three-dimensional object 70 is less compared to the ink that eventually forms the part corresponding to the surface portion 71*a* of the three-dimensional object 70 by 100% (=25%×4) of the amount corresponding to the thickness t. That is, the height of the part corresponding to the interior 71*b* of the three-dimensional object 70 in the vertical direction has a difference with the height of the part corresponding to the surface portion 71*a* of the three-dimensional object 70 in the vertical direction in the four layers of the ink layers 70*d* to 70*g* that increases for every layer, and eventually, becomes lower than the height of the part corresponding to the surface portion 71*a* of the three-dimensional object 70 in the vertical direction by the thickness t.

Next, the controller 47 increases the ejection amount of ink ejected by the inkjet head 23 by 20% from the amount corresponding to the thickness t for each of the ink layers 70*h* to 70*l*, and then removes 20% of the amount corresponding to the thickness t with respect to the part corresponding to the surface portion 71*a* of the three-dimensional object 70 through flattening by the flattening roller 24 to make the final thickness of the part corresponding to the surface portion 71*a* of the three-dimensional object 70 as thickness t. Here, since the part corresponding to the interior 71*b* of the three-dimensional object 70 is lower than the flattening roller 24 in the vertical direction, such a part does not come into contact with the flattening roller 24 and thus is not flattened. The part corresponding to the interior 71*b* of the three-dimensional object 70 in the ink layers 70*h* to 70*l* form a region where a range in a direction orthogonal to the layering direction of the ink layer indicated by the arrow 20*a*, that is, the extending direction of the ink layer indicated by the arrow 20*b* (see FIG. 3) and the arrow 20*c* overlaps the ink ejection amount reduction region. In the five layers of the ink layers 70*h* to 70*l*, the ink that eventually forms the part corresponding to the interior 71*b* of the three-dimensional object 70 is large compared to the ink that eventually forms the part corresponding to the surface portion 71*a* of the three-dimensional object 70 by 100% (=20%×5) of the amount corresponding to the thickness t. That is, the height of the part corresponding to the interior 71*b* of the three-dimensional object 70 in the vertical direction gradually approaches the height of the part corresponding to the surface portion 71*a* of the three-dimensional object 70 in the vertical direction for every layer in the five layers of the ink layers 70*h* to 70*l*, and eventually, becomes the same as the height of the part corresponding to the surface portion 71*a* of the three-dimensional object 70 in the vertical direction.

Next, the controller 47 increases the ejection amount of ink ejected by the inkjet head 23 by 20% from the amount corresponding to the thickness t for each of the ink layers 70*m* to 70*n*, and then removes 20% of the amount corresponding to the thickness t through flattening by the flattening roller 24 to make the final thickness as thickness t.

The controller 47 repeats the processes similar to the processes for the ink layers 70*d* to 70*n* with respect to the ink layers on the upper side of the ink layer 70*n*.

Of the eleven ink layers 70*d* to 70*n*, only two ink layers 70*m* to 70*n* are subjected to flattening with respect to a part corresponding to the interior 71*b* of the three-dimensional object 70. Therefore, the probability that flattening will be executed in the interior 71*b* of the three-dimensional object 70 is 2/11. In other words, the probability that flattening will be executed in the interior 71*b* of the three-dimensional object 70 is less than 1/5, indicating that the amount of waste ink caused by flattening is less than 1/5 of the conventional three-dimensional object manufacturing method. This probability can be changed by adjusting a proportion of reduction when reducing the ejection amount of ink ejected by the inkjet head 23 with respect to the part corresponding to the interior 71*b* of the three-dimensional object 70 from the amount corresponding to the thickness t, proportion of increase when increasing the ejection amount of ink ejected by the inkjet head 23 with respect to the part corresponding to the interior 71*b* of the three-dimensional object 70 from the amount corresponding to the thickness t, and the number of ink layers in which flattening is to be executed with respect to the part corresponding to the interior 71*b* of the three-dimensional object 70.

Figure 10:
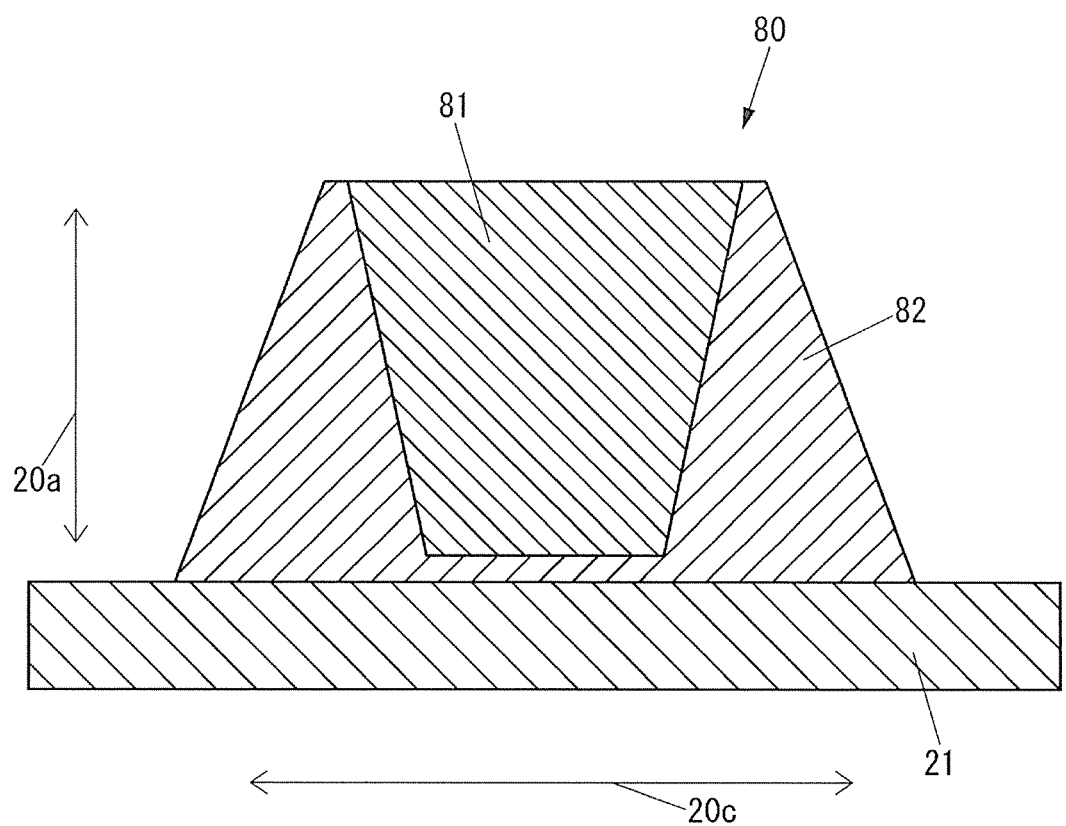
FIG. 10 is a front cross-sectional view of an example different from the example shown in FIG. 8 of a three-dimensional object manufactured through a conventional three-dimensional object manufacturing method by the three-dimensional object manufacturing device shown in FIG. 2.
Figure 11:
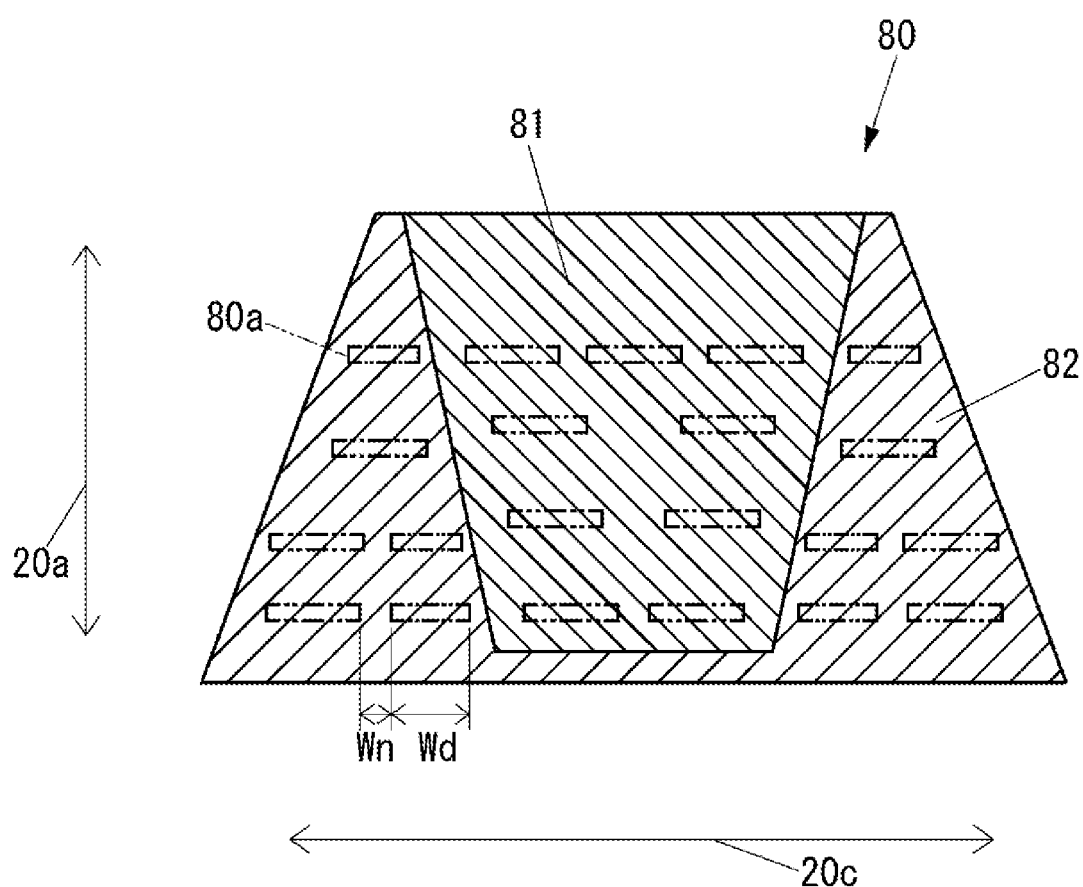
FIG. 11 is a schematic cross-sectional view of the three-dimensional object shown in FIG. 10 in which a plurality of cavity data are formed by the three-dimensional object manufacturing method of the present disclosure.

FIG. 10 is a front cross-sectional view of a three-dimensional object 80 manufactured by the three-dimensional object manufacturing device 20 through the conventional three-dimensional object manufacturing method. FIG. 11 is a schematic cross-sectional view of the three-dimensional object 80 in which data (hereinafter referred to as "cavity data") 80*a* of a plurality of cavity data are formed by the three-dimensional object manufacturing method of the present disclosure.

In FIG. 10, the three-dimensional object 80 includes: a target shaped object 81 and a support portion 82 that supports the overhanging portion of the side surface of the target shaped object 81 from below.

The printer driver 54*a* displays a UI that receives an instruction to save waste ink on the display 52 of the computer 50. When instruction is made through the operator 51 to cause the three-dimensional object manufacturing device 20 to execute the manufacturing of the three-dimensional object 80 based on the three-dimensional data of the three-dimensional object 80, the printer driver 54*a* generates the manufacturing data for causing the three-dimensional object manufacturing device 20 to manufacture the three-dimensional object 80 when the instruction is not made to save the waste ink on the UI, and generates the manufacturing data for causing the three-dimensional object manufacturing device 20 to manufacture the three-dimensional object 80 shown in FIG. 11 formed with a plurality of cavity data 80*a* when the instruction is made to save the waste ink on the UI.

FIG. 11 shows an example in which the ink ejection amount reduction region is formed by cavity data. The plurality of cavity data 80*a* arranged adjacently in the vertical direction and the horizontal direction exist in the interior the target shaped object 81 and the support portion 82 of the three-dimensional object 80. A distance Wn between the cavity data 80*a* arranged adjacent to each other in the horizontal direction is preferably shorter than a width Wd of the cavity data 80*a* in the horizontal direction as the ink ejection amount reduction region is wide.

Hereinafter, the manufacturing process of a part in the vicinity of the cavity data 80*a* in the target shaped object 81 and the support portion 82 shown in FIG. 11 will be described.

In the following, the thickness in the vertical direction of the ink layer before flattening is T, the thickness in the vertical direction of the ink layer after flattening is t, and the height of the cavity data 80*a* in the vertical direction is assumed to be a height g much larger than the thickness T and the thickness t.

FIG. 12A to FIG. 12D are views showing a manufacturing process of a part in the vicinity of the cavity data 80*a* in the target shaped object 81.

Figure 12A:
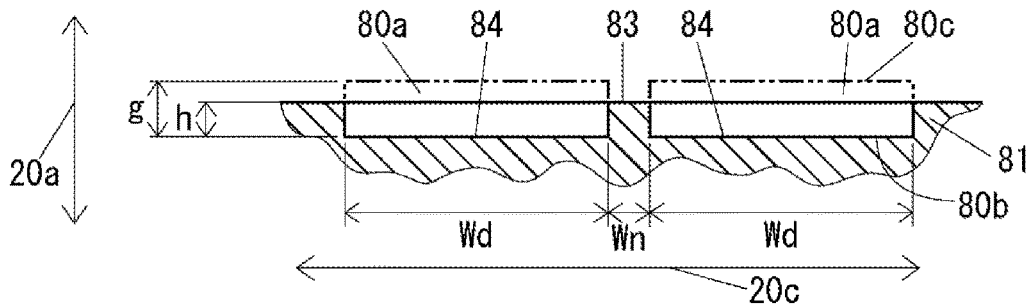
FIG. 12A to FIG. 12D are views showing a manufacturing process of a part in the vicinity of cavity data in a target shaped object shown in FIG. 11.

When manufacturing a vicinity of the two cavity data 80*a* arranged in a direction perpendicular to the vertical direction, that is, the horizontal direction in the manufacturing data, as shown in FIG. 12A, the controller 47, until the height of an upper end 83 of the ink layer on the uppermost side in the vertical direction reaches the height of an upper end 80c of the cavity data 80a in the vertical direction after reaching the height of the lower end 80b of the cavity data 80a in the vertical direction, makes the ejection amount of ink ejected by the inkjet head 23 with respect to a part Wn other than a part Wd corresponding to the cavity data 80a to an amount corresponding to the thickness T for each ink layer, and makes the ejection amount of ink ejected by the inkjet head 23 with respect to a part Wd corresponding to the cavity data 80a to zero, and then performs flattening by the flattening roller 24 to make the final thickness of the part Wn other than the part corresponding to the cavity data 80a as t. Therefore, a groove 84 is formed in a part corresponding to the cavity data 80a. Furthermore, the part corresponding to the cavity data 80a forms the ink ejection amount reduction region of the present disclosure.

Figure 12B:
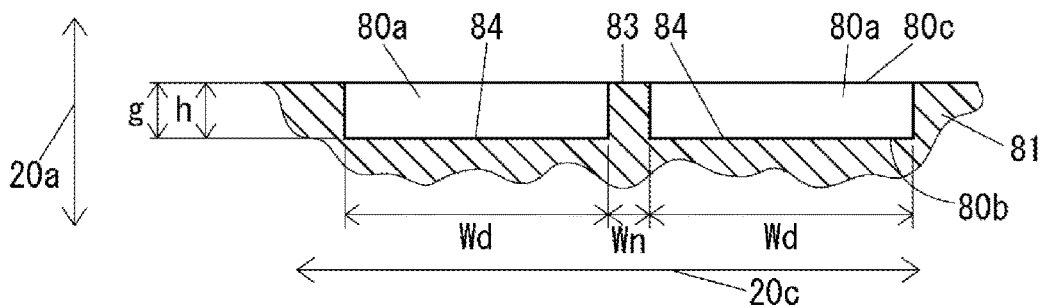
Figure 12C:
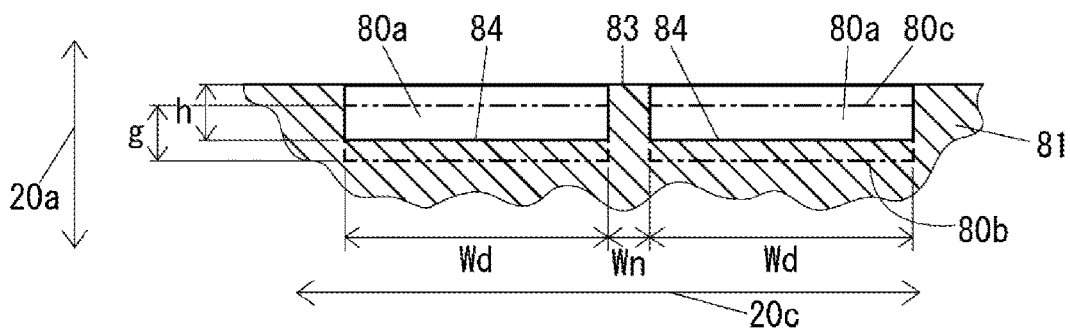
Figure 12D:
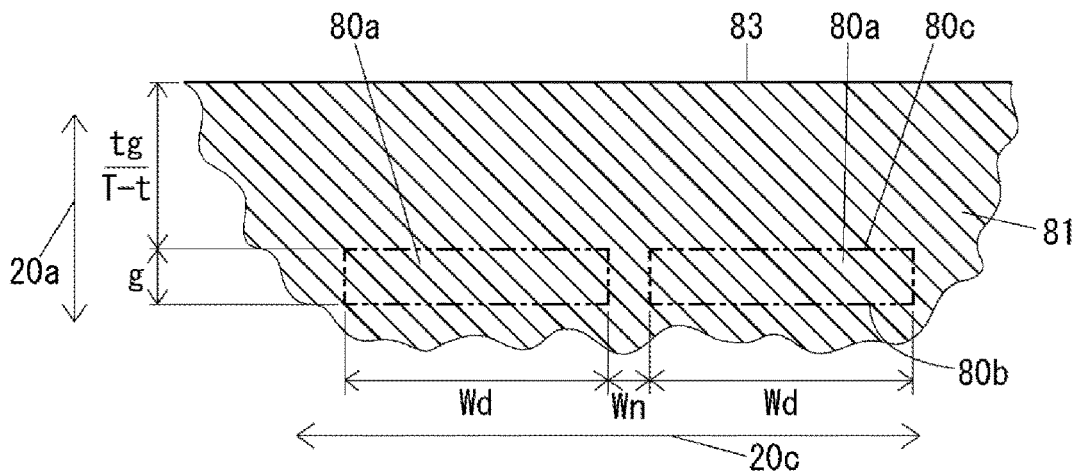

As shown in FIG. 12B, when the height of the upper end 83 of the ink layer on the uppermost side in the vertical direction reaches the height of the upper end 80c of the cavity data 80a in the vertical direction, the controller 47 controls the inkjet head 23 to form an uncured ink layer of a thickness T for each ink layer, as shown in FIG. 12C, and then the controller 47 controls the flattening roller 24 to form an uncured ink layer of thickness t through flattening. Here, since the part corresponding to the interior of the groove 84 is lower than the lower end of the flattening roller 24 in the vertical direction, the part corresponding to the interior of the groove 84 does not come into contact with the flattening roller 24 and thus is not flattened. In the ink layer in which the height of the upper end 83 in the vertical direction is greater than the height of the upper end 80c of the cavity data 80a in the vertical direction, a part corresponding to the interior of the groove 84 forms a region where a range in the extending direction of the ink layer overlaps the ink ejection amount reduction region. Each time an ink layer of thickness t is formed in the part corresponding to the exterior of the groove 84, an ink layer of thickness T is formed in the part corresponding to the interior of the groove 84. Therefore, each time an ink layer of thickness t is formed in a part corresponding to the exterior of the groove 84, the height h of the groove 84 in the vertical direction is decreased by "T−t". That is, from the state shown in FIG. 12B, when "g/(T−t)" ink layers of thickness t are formed in the part corresponding to the exterior of the groove 84, the groove 84 is completely eliminated as shown in FIG. 12D.

The number of ink layers having a thickness t corresponding to the ink ejection amount reduction region is "g/t" as the height of the cavity data 80a serving as the ink ejection amount reduction region is height g. Furthermore, the number of ink layers having a thickness t corresponding to a region where a range in the extending direction of the ink layer overlaps the ink ejection amount reduction region above the ink ejection amount reduction region and until the groove 84 is completely eliminated is "g/(T−t)" as described above. That is, between the "gT/t (T−t)" layer which is the sum, flattening is not performed in a part corresponding to the cavity data 80a and a part above such a part. Furthermore, when flattening is performed only for the upper two layers, and another cavity data 80a exists above such two layers, the probability that the flattening will be executed in a specific part of the interior the three-dimensional object 80 is, $2/\{2+gT/t\,(T-t)\}$. Here, assuming that g=2 mm, T=32 µm, and t=24 µm, the probability that flattening will be executed in a specific part of the interior the three-dimensional object 80 is less than 1%. That is, in a case where the distance Wn between the cavity data 80a arranged adjacent to each other in the horizontal direction is extremely shorter than the width Wd of the cavity data 80a in the horizontal direction, the probability that flattening will be executed in the interior of the three-dimensional object 80 is less than 1/100.

Figure 13:
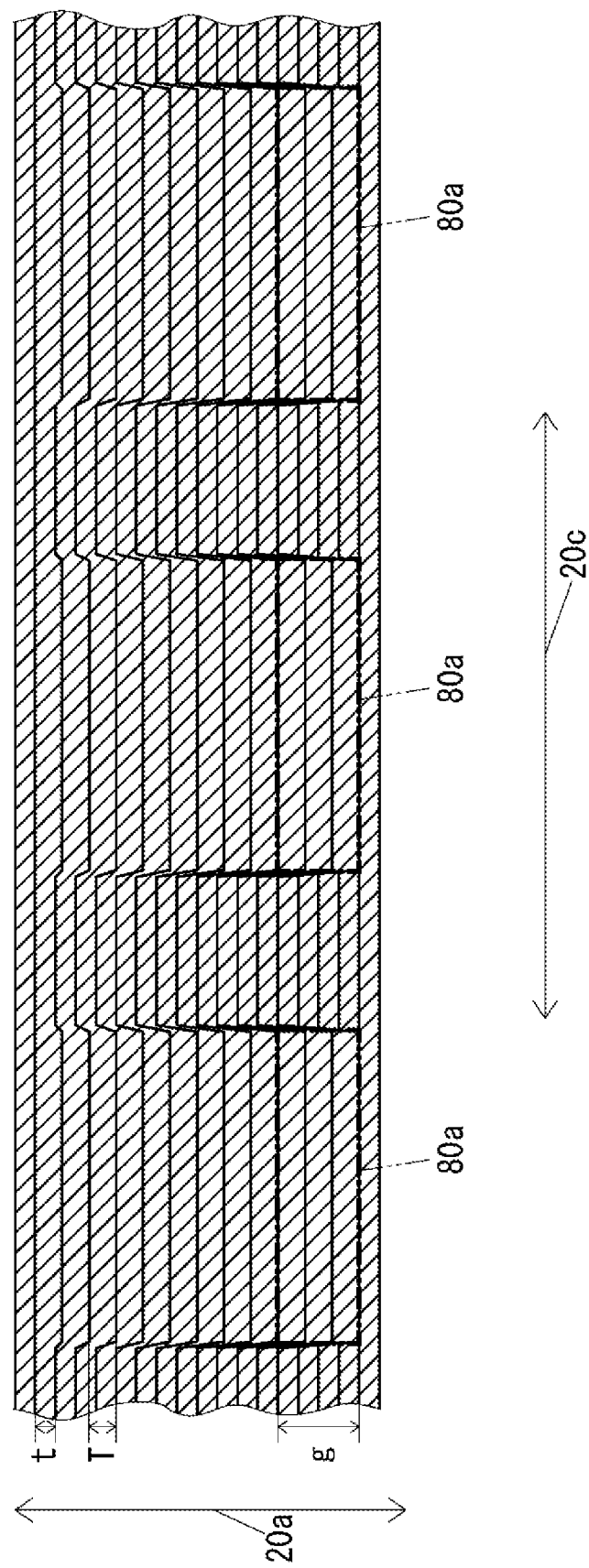
FIG. 13 is a schematic front cross-sectional view of one part of the target shaped object shown in FIG. 11.

FIG. 13 is a schematic front cross-sectional view of one part of the target shaped object 81. FIG. 13 shows an image of layering of the ink layers in the target shaped object 81 in order to facilitate the understanding of the state of layering of the ink layers in the target shaped object 81. In FIG. 13, the ratio of the thickness t and the thickness T of the ink layer with respect to the height g of the cavity data 80a is drawn extremely large in comparison with the target shaped object 81 described above as g=2 mm, T=32 µm, and t=24 µm.

In the above, the manufacturing process of a part in the vicinity of the cavity data 80a of the target shaped object 81 and the support portion 82 has been described, but the outer shape end of the cavity data 80a is preferably separated 3 mm, for example, toward the inner side from the outer shape end of the target shaped object 81 and the support portion 82. The deformation of the outer shape of the target shaped object 81 and the support portion 82 can be prevented by separating.

As described above, when forming a specific ink layer by the inkjet head 23, the three-dimensional object manufacturing system 10 forms the ink ejection amount reduction region in which the ejection amount of ink ejected by the inkjet head 23 is reduced from the amount corresponding to the thickness t, and hence the ink is not removed by the flattening roller 24 with respect to the ink ejection amount reduction region when adjusting the thickness of the specific ink layer to the thickness t by the flattening roller 24. Therefore, the three-dimensional object manufacturing system 10 can significantly reduce the amount of ink removed from the ink layer, that is, the discarded amount of ink as compared with the conventional art.

In particular, when forming the ink ejection amount reduction region in at least one part of the support portion 82 which is often larger in volume than the target shaped object 81, the three-dimensional object manufacturing system 10 can effectively reduce the amount of ink removed from the ink layer, that is, the discarded amount of ink.

The three-dimensional object manufacturing system 10 can reduce the amount of ink removed from the ink layer as compared with the conventional art, and thus can reduce the manufacturing cost of the three-dimensional object by the cost of the ink corresponding to the reduction of the amount of ink as compared with the conventional art.

The three-dimensional object manufacturing system 10 can reduce the amount of ink removed from the ink layer as compared to the conventional art, and thus can reduce the environmental load by the manufacturing of the three-dimensional object by the reduction in the amount of ink removed from the ink layer.

As shown in FIG. 7, the waste ink receiver 26 needs to be disposed on the upper side in the vertical direction than the surface of the ink layer 62 after flattening by the flattening roller 24, that is, the flattened surface 62a (see FIG. 7) in order to prevent from coming into contact with the uncured ink layer 62 after the flattening by the flattening roller 24. Therefore, the waste ink receiver 26 cannot be made deep in the vertical direction, and its capacity is small. Thus, if the amount of ink removed from the ink layer by the flattening roller 24 is large, the waste ink may overflow from the waste ink receiver 26 and damage the three-dimensional object manufacturing device 20 and the three-dimensional object being manufactured when the waste ink is not collected in the waste ink bottle 28 at an appropriate timing from the waste ink receiver 26. However, since the three-dimensional object manufacturing system 10 can significantly reduce the amount of ink removed from the ink layer as compared with the conventional art, the possibility of the waste ink overflowing from the waste ink receiver 26 can be reduced as compared with the conventional art, and as a result, the possibility of the three-dimensional object manufacturing device 20 and the three-dimensional object being manufactured being damaged by the waste ink can be reduced as compared with the conventional art.

As the ink removed from the ink layer by the flattening roller 24 is sometimes semi-cured by ultraviolet light, this may become a cause of clogging in the circulation path of the waste ink, for example, the tube 29. If clogging occurs in the circulation path of the waste ink due to the semi-cured ink removed from the ink layer by the flattening roller 24, the waste ink is not collected from the waste ink receiver 26 into the waste ink bottle 28, and the waste ink overflows from the waste ink receiver 26 thus damaging the three-dimensional object manufacturing device 20 and the three-dimensional object being manufactured. However, since the three-dimensional object manufacturing system 10 can significantly reduce the amount of ink removed from the ink layer as compared with the conventional art, the occurrence of clogging in the circulation path of the waste ink can be suppressed as compared with the conventional art. Therefore, the three-dimensional object manufacturing system 10 can reduce the possibility of the waste ink overflowing from waste ink receiver 26 as compared with the conventional art, and as a result, the possibility of the three-dimensional object manufacturing device 20 and the three-dimensional object being manufactured being damaged by the waste ink can be reduced as compared with the conventional art.

The three-dimensional object manufacturing system 10 can reduce the amount of ink removed from the ink layer as compared with the conventional art, and hence the replacement frequency of the waste ink bottle 28 can be significantly reduced as compared with the conventional art. Furthermore, the waste ink receiver 26 may be easily detached/attached, and may be periodically washed, discarded, or replaced as a suction member such as a cartridge or non-woven fabric, in which case the waste ink bottle 28, the suction pump 30, and the like become unnecessary. That is, the three-dimensional object manufacturing system 10 can improve convenience as compared with the conventional art, and can reduce the number of components of the three-dimensional object manufacturing device 20.

When forming a specific ink layer with the inkjet head 23, the three-dimensional object manufacturing system 10 forms an ink ejection amount reduction region in a part corresponding to the interior of the three-dimensional object that does not directly contribute to the shaping quality. Here, in a case of the support portion of the three-dimensional object, the interior of the three-dimensional object is a part on the inner side of a region of a specific thickness such as, for example, 3 mm from the surface of the support portion. The surface of the support portion also includes a surface in contact with the target shaped object 90. Moreover, in a case of the target shaped object of the three-dimensional object, the interior of the three-dimensional object is a part on the inner side of a region of a specific thickness from the surface of the target shaped object. However, in a case where the target shaped object includes a color layer to be visually recognized from the outside, the interior of the target shaped object is preferably a part on the inner side of the color layer in the target shaped object.

Figure 14:
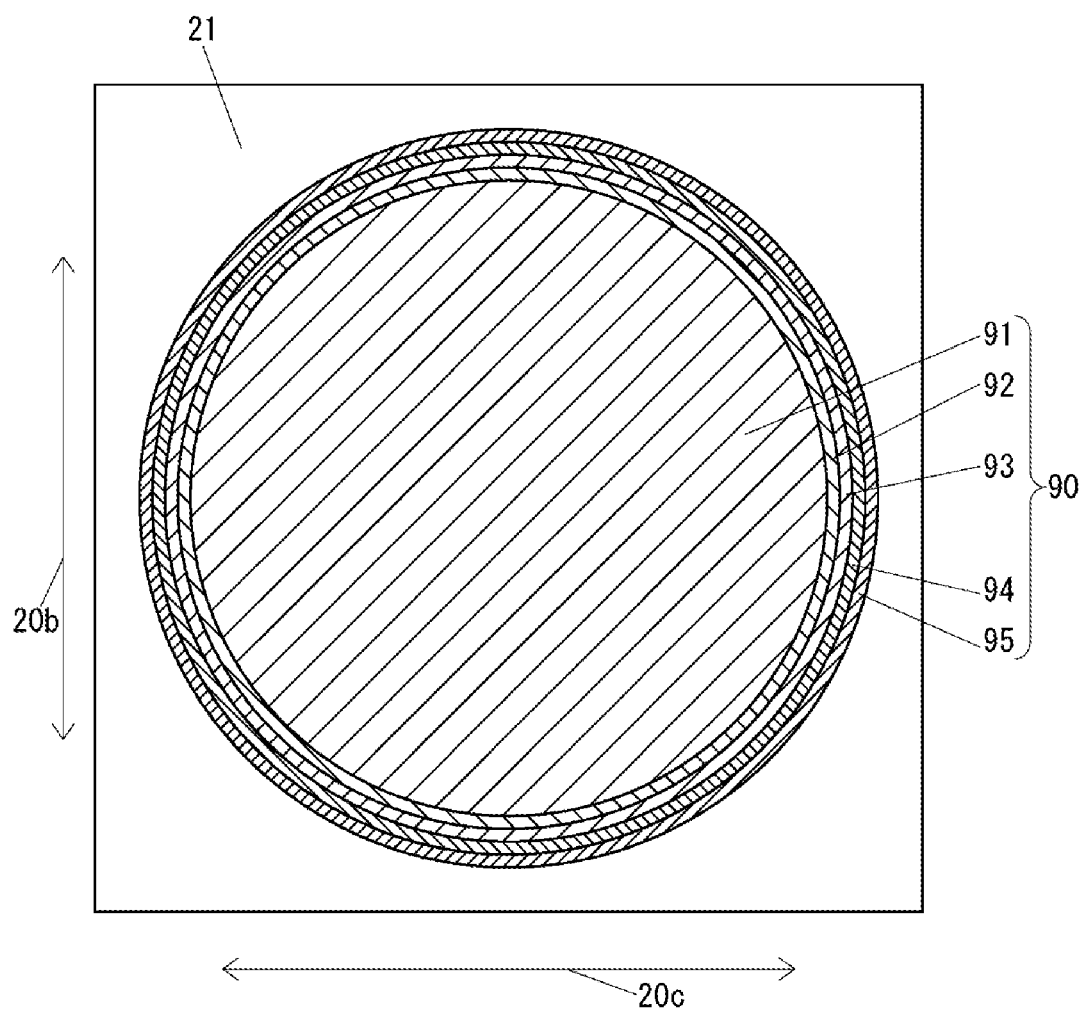
FIG. 14 is a plan cross-sectional view showing an internal structure of an example of the target shaped object manufactured by the three-dimensional object manufacturing device shown in FIG. 2.

FIG. 14 is a plan cross-sectional view showing an internal structure of the target shaped object 90. Note that FIG. 14 is drawn with the support portion omitted.

As shown in FIG. 14, the target shaped object 90 includes a part 91 that forms the interior and a plurality of "layers" on the outer side of the part 91. Here, the "layer" is a region configured with a constant thickness in the normal direction of the surface of the target shaped object 90. The plurality of "layers" includes a light reflective layer 92 formed of white ink, a separation layer 93 formed of transparent ink on the outer side of the light reflective layer 92, a color layer 94 formed with coloring or color image by a color ink of a subtractive color mixing method such as cyan, magenta, yellow, and black and a transparent ink on an outer side of the separation layer 93, and a protective layer 95 formed of transparent ink on the outer side of the color layer 94. The thickness in the normal direction of each of such layers is such that the light reflective layer 92 and the color layer 94 are in the range of 100 µm to 500 µm, and the separation layer 93 and the protective layer 95 are in the range of 50 µm to 100 µm to obtain a satisfactory surface color image quality. Since the part 91 is not visually recognized from the outside, it is formed of ink used for the other layers and the plurality of inks thereof to form the outer appearance shape and the interior of the target shaped object 90. The light reflective layer 92 is provided to reflect the external light transmitted through the protective layer 95, the color layer 94, and the separation layer 93 to again exit the light to the outside and make it visible, and at the same time to make the part 91 not visible from the outside. The separation layer 93 is provided to separate the light reflective layer 92 and the color layer 94 so as to avoid color mixture of the ink. The protective layer 95 is provided to protect the color layer 94 from scratches and color changes caused by external stimuli. In the target shaped object 90, the ink ejection amount reduction region may be arranged in the part 91, and the ink ejection amount reduction region may be arranged not only in the part 91 but also in the light reflective layer 92 and the separation layer 93. However, it is preferable that the ink ejection amount reduction region is not disposed at least in the color layer 94 in the target shaped object 90. Furthermore, when the target shaped object 90 has no coloring or color image and is formed only with the part 91, the ink ejection amount reduction region is preferably not disposed to a specific thickness such as 3 mm from at least the outermost layer of the part 91, for example, the surface in order to ensure the quality of the outer appearance shape.

In the three-dimensional object manufacturing system 10, when the ink ejection amount reduction region is disposed on the inner side of the color layer 94 in the target shaped object 90, the ejection amount of ink with respect to the color layer 94 of the target shaped object 90 can be suppressed from reducing in forming the ink layer, and as a result, the color quality of the target shaped object 90 can be suppressed from degrading.

The three-dimensional object manufacturing system 10 can easily generate the manufacturing data for forming the ink ejection amount reduction region when forming the ink ejection amount reduction region by forming the cavity data 80a (see FIG. 11) in the part corresponding to the ink ejection amount reduction region in the manufacturing data used by the three-dimensional object manufacturing device 20. The three-dimensional object manufacturing system 10 may form cavity data not in all the parts corresponding to the ink ejection amount reduction region but only in one part in the manufacturing data used by the three-dimensional object manufacturing device 20.

Figure 15A:
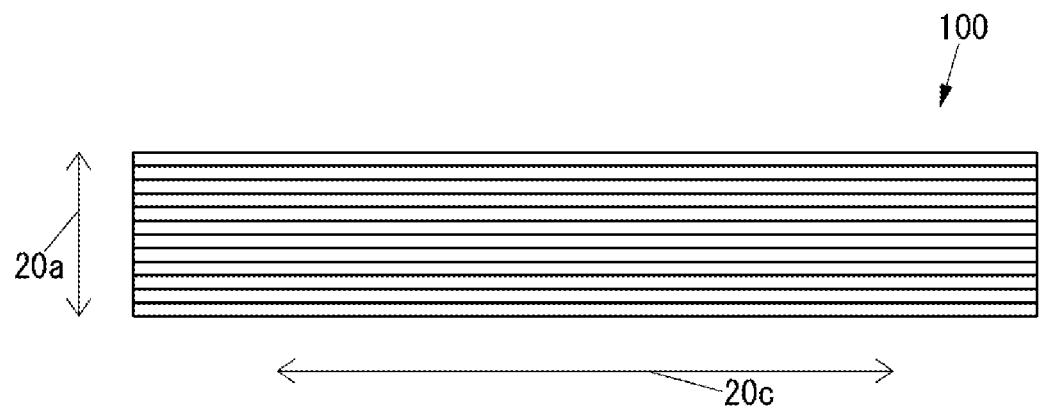
FIG. 15A is a view showing an image of manufacturing data of an example different from the examples shown in FIG. 8 and FIG. 10 of the three-dimensional object manufactured by the three-dimensional object manufacturing device shown in FIG. 2.
Figure 15B:
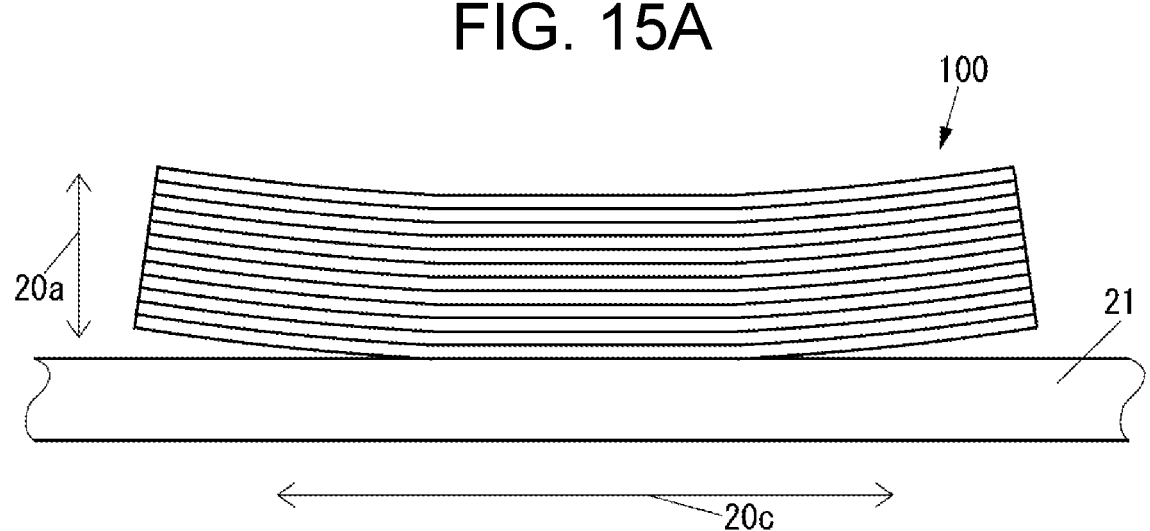
FIG. 15B is a view showing a front cross-sectional view of a three-dimensional object manufactured without providing an ink ejection amount reduction region by the three-dimensional object manufacturing device based on the manufacturing data shown in FIG. 15A.

In a case where the three-dimensional object manufacturing system 10 manufactures three-dimensional object without providing the ink ejection amount reduction region, the thickness in the vertical direction of each ink layer of the three-dimensional object is constant in all ranges in the horizontal direction. Here, since the ink layer is cured by the ultraviolet lights irradiated from the upper side in the vertical direction by the ultraviolet irradiator 27, the ink layer shrinks, although slightly, toward the upper side in the vertical direction. Therefore, for example, the three-dimensional object manufacturing system 10 may manufacture a three-dimensional object 100 deformed and warped in the vertical direction as shown in FIG. 15B even if it is manufactured based on the manufacturing data of the three-dimensional object 100 extending straightly in the horizontal direction, as shown in FIG. 15A, in which the thickness in the vertical direction of each ink layer is constant in all ranges in the horizontal direction. When warpage occurs in the three-dimensional object 100, the three-dimensional object manufacturing system 10 cannot manufacture the three-dimensional object 100 as the distal end portion of the cured warpage collides with the flattening roller 24. Furthermore, when warpage occurs in the three-dimensional object 100, the nozzle surface of the inkjet head 23 rubs the three-dimensional object 100, which becomes a cause of failure of the three-dimensional object manufacturing device 20 such as the inkjet head 23. In the three-dimensional object 100 shown in FIG. 15B, warpage located on the upper side toward the end has occurred. However, in a case where each ink layer is formed with a transparent ink, the three-dimensional object manufacturing system 10 has a larger amount of ultraviolet light irradiated toward the lower layer, and hence the warpage located on the lower side toward the end, which is opposite to FIG. 15B, occurs. Furthermore, in FIG. 15A to FIG. 15C, only the target shaped object is shown of the three-dimensional object 100, and the support portion formed at the periphery of the target shaped object is omitted.

Figure 15C:
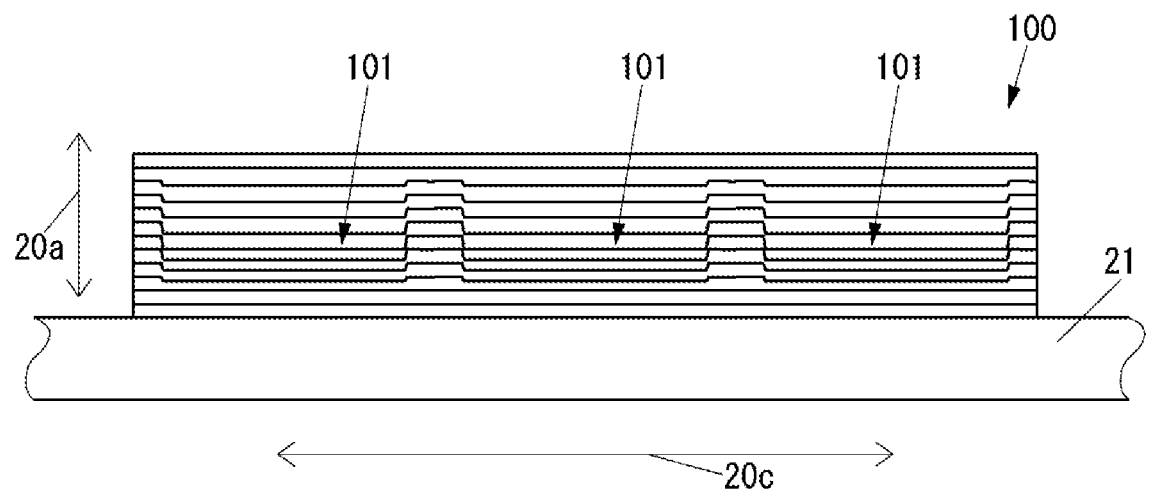
FIG. 15C is a view showing a front cross-sectional view of a three-dimensional object manufactured while providing an ink ejection amount reduction region by the three-dimensional object manufacturing device based on the manufacturing data shown in FIG. 15A.

When the three-dimensional object manufacturing system 10 manufactures the three-dimensional object while providing the ink ejection amount reduction region, as shown in FIG. 15C, the deformation and warpage of the ink layer in the layering direction shown with the arrow 20a of the ink layer can be suppressed by the ink ejection amount reduction region 101 provided in the extending direction of the ink layer, and hence the accuracy in the shape of the three-dimensional object 100 can be enhanced. As shown in FIG. 15C, the three-dimensional object manufacturing system 10 preferably forms, on the three-dimensional object 100, a plurality of ink ejection amount reduction region 101 in which the ranges in the extending direction of the ink layer do not at least partially overlap each other from the viewpoint of effectively suppressing the warpage of the ink layer in the layering direction.

Figure 16A:
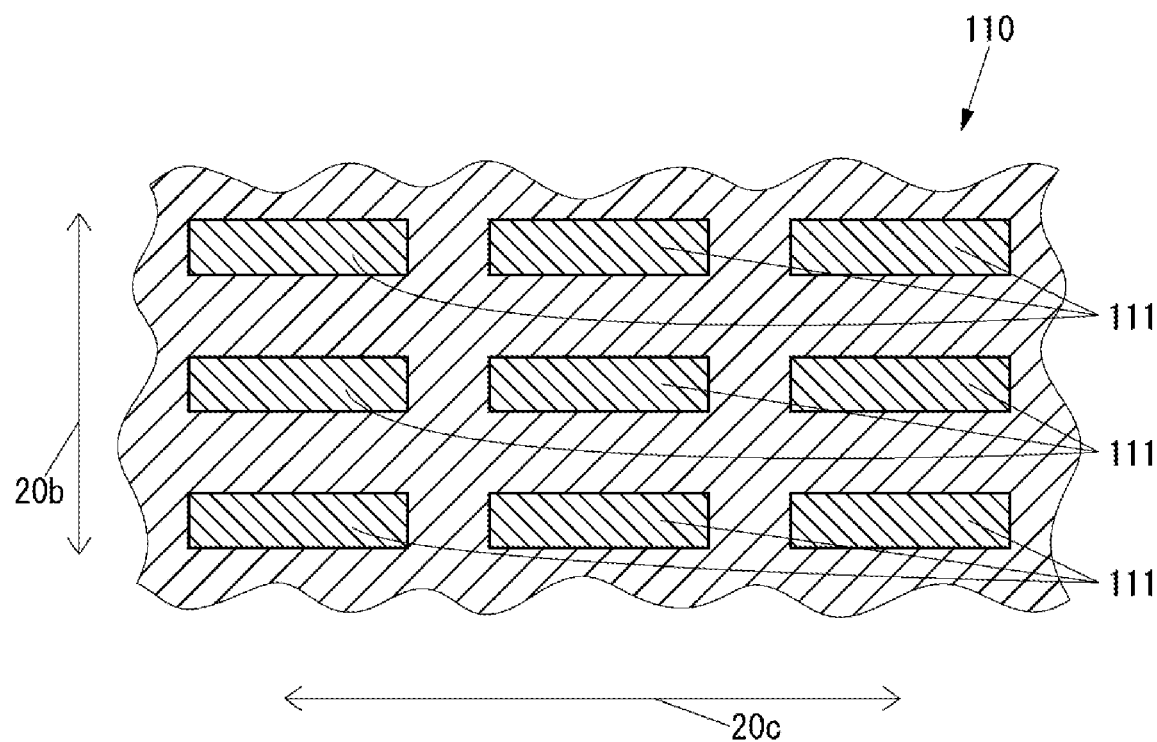
FIG. 16A is a plan cross-sectional view of one part of an example different from the examples shown in FIG. 8, FIG. 10, and FIG. 15A to FIG. 15C of the three-dimensional object manufactured by the three-dimensional object manufacturing device shown in FIG. 2.
Figure 16B:
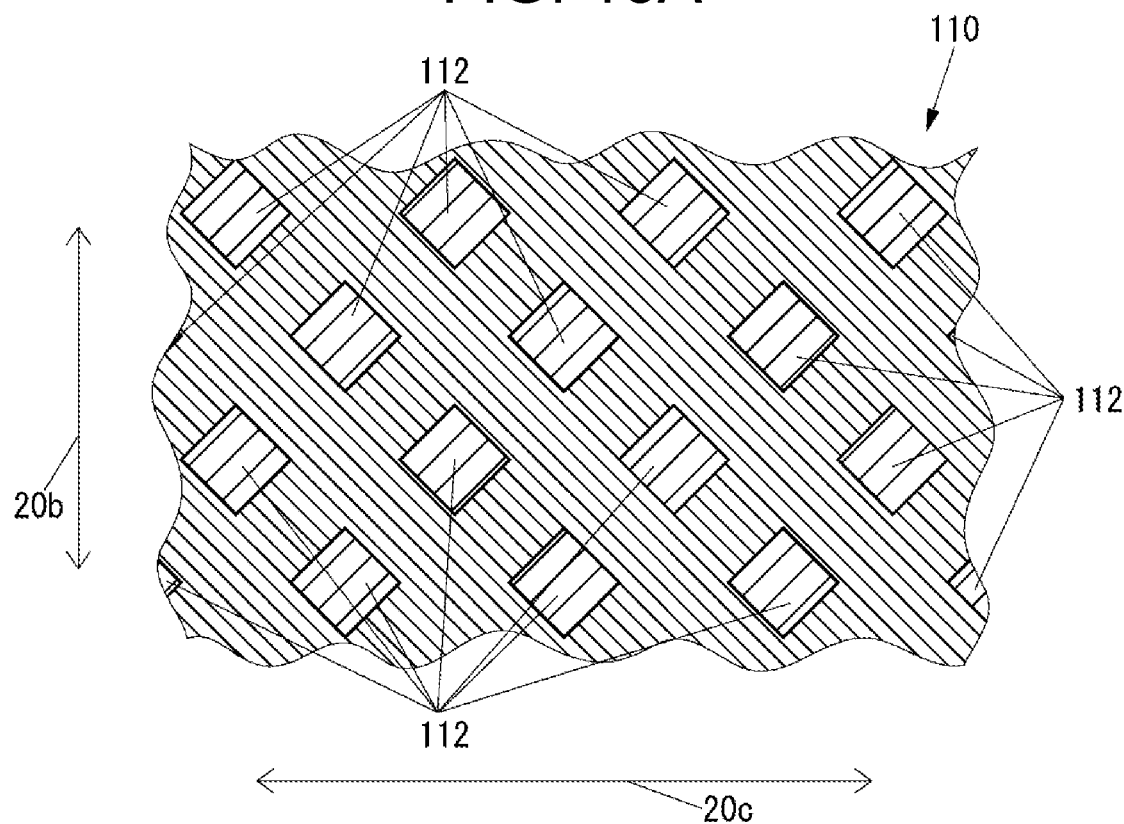
FIG. 16B is a plan cross-sectional view of the three-dimensional object shown in FIG. 16A in which position, size and shape of the ink ejection amount reduction region are changed.

The three-dimensional object manufacturing system 10 preferably manufactures the three-dimensional object in which a difference in the periodicity of the ink ejection amount reduction region for each direction is small, rather than manufacturing a three-dimensional object in which a difference in the periodicity of the ink ejection amount reduction region for each direction is large in the direction orthogonal to the vertical direction from the viewpoint of effectively suppressing the warpage of the ink layer in the layering direction. For example, the three-dimensional object 110 shown in FIG. 16A has a difference in the periodicity of an ink ejection amount reduction region 111 in the front and back direction indicated by the arrow 20b and the periodicity of an ink ejection amount reduction region 111 in the left and right direction indicated by the arrow 20c. On the other hand, the three-dimensional object 110 shown in FIG. 16B does not have a difference in the periodicity of an ink ejection amount reduction region 112 in the front and back direction indicated by the arrow 20b and the periodicity of an ink ejection amount reduction region 112 in the left and right direction indicated by the arrow 20c. Therefore, the three-dimensional object manufacturing system 10 preferably manufactures the three-dimensional object 110 shown in FIG. 16B than the three-dimensional object 110 shown in FIG. 16A from the viewpoint of effectively suppressing the warpage of the ink layer in the layering direction. Furthermore, the three-dimensional object manufacturing system 10 preferably has no periodicity in all directions orthogonal to the vertical direction from the viewpoint of effectively suppressing the warpage of the ink layer in the layering direction. That is, the three-dimensional object manufacturing system 10 preferably has random position, size, and shape of the ink ejection amount reduction region in all directions orthogonal to the vertical direction from the viewpoint of effectively suppressing the warpage of the ink layer in the layering direction. In FIG. 16A, a part shown as the ink ejection amount reduction region 111 of the three-dimensional object 110 may be assumed as a region other than the ink ejection amount reduction region, and a part not shown as the ink ejection amount reduction region 111 may be assumed as the ink ejection amount reduction region. Similarly, In FIG. 16B, a part shown as the ink ejection amount reduction region 112 of the three-dimensional object 110 may be assumed as a region other than the ink ejection amount reduction region, and a part not shown as the ink ejection amount reduction region 112 may be assumed as the ink ejection amount reduction region.

Figure 17:
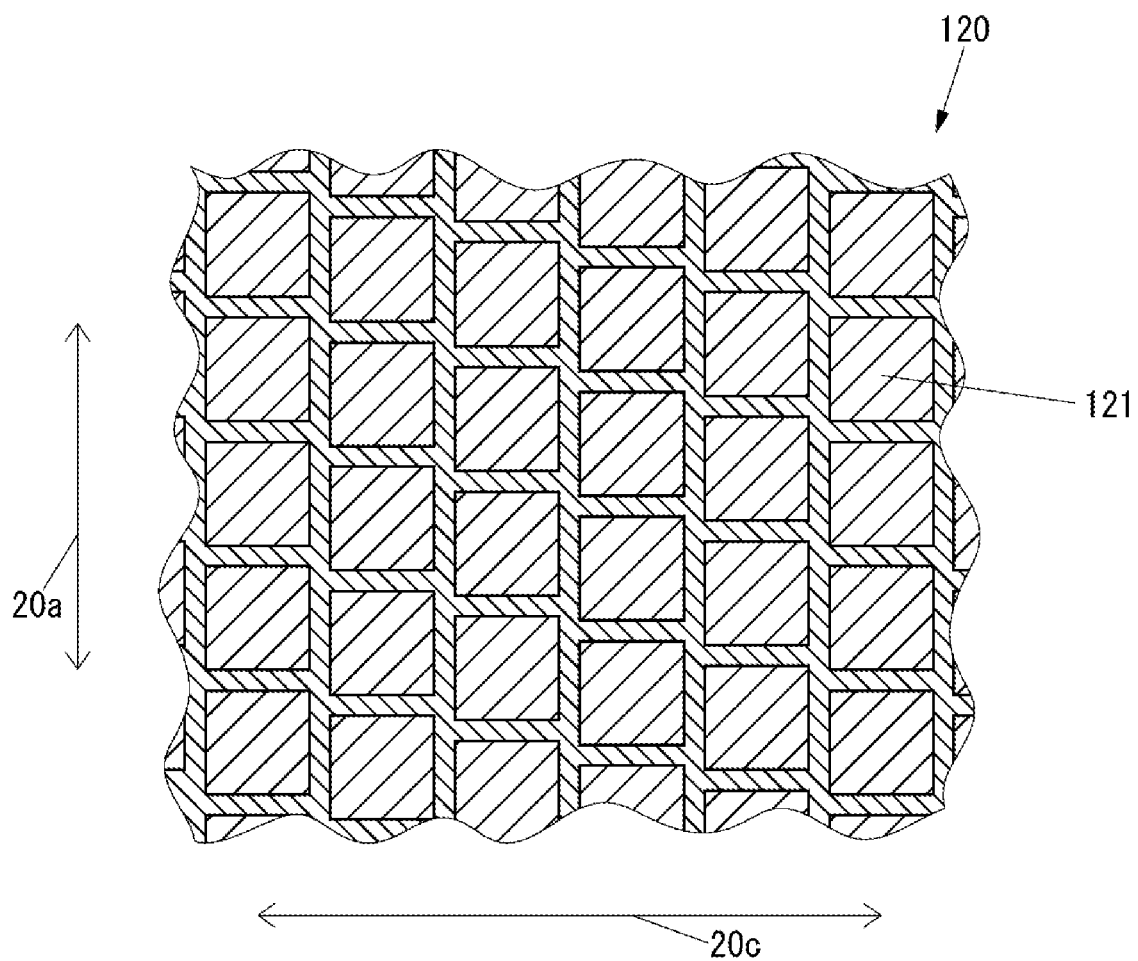
FIG. 17 is a front cross-sectional view of one part of an example different from the examples shown in FIG. 8, FIG. 10, FIG. 15A to FIG. 15C, FIG. 16A, and FIG. 16B of the three-dimensional object manufactured by the three-dimensional object manufacturing device shown in FIG. 2.

The three-dimensional object manufacturing system 10 may form, on the three-dimensional object, a plurality of ink ejection amount reduction regions in which the ranges in the direction orthogonal to the extending direction of the ink layer only partially overlap each other. For example, the three-dimensional object manufacturing system 10 may manufacture a three-dimensional object 120 shown in FIG. 17. In the three-dimensional object 120 shown in FIG. 17, the ink ejection amount reduction regions 121 adjacent to each other in the extending direction of the ink layer are disposed shifted in the direction orthogonal to the extending direction of the ink layer. That is, in the ink ejection amount reduction regions 121 adjacent to each other in the extending direction of the ink layer, the ranges in the direction orthogonal to the extending direction of the ink layer only partially overlap each other. Therefore, the three-dimensional object 120 is not subjected to flattening on the entire surface by the flattening roller 24 for all ink layers. When a plurality of ink ejection amount reduction regions in which the ranges in the direction orthogonal to the extending direction of the ink layer only partially overlap each other are formed in the three-dimensional object, the three-dimensional object manufacturing system 10 can reduce the ink layer in which flattening is executed on the entire surface by the flattening roller 24 by such ink ejection amount reduction regions, and as a result, failure of flattening by the flattening roller 24 can be reduced. In the three-dimensional object manufacturing system 10, when the adhesion of the ink forming the ink layer before flattening by the flattening roller 24 is strong, the ink adheres excessively to the flattening roller 24 at the time of flattening by the flattening roller 24, and the thickness of the ink layer may become less than the thickness t or the rotation of the flattening roller 24 may be stopped due to the adhesion of the ink. Therefore, since the possibility of occurrence of these problems increases as the area of the surface of the ink layer on which the flattening is executed by the flattening roller 24 increases in the three-dimensional object manufacturing system 10, the possibility the type of ink used will be limited is high. However, as the three-dimensional object manufacturing system 10 can reduce the area of the surface of the ink layer on which flattening is executed by the flattening roller 24, the possibility of occurrence of these problems can be reduced, and as a result, the types of usable inks can be increased.

In the present embodiment, the three-dimensional object manufacturing system 10 generates the manufacturing data including an ink ejection amount reduction region by means of the computer 50. However, the three-dimensional object manufacturing system 10 may generate the manufacturing data including the ink ejection amount reduction region by means of the three-dimensional object manufacturing device 20.

Furthermore, in the present embodiment, the shape of the ink ejection amount reduction region has been described as a rectangle, but it can be an arbitrary shape as long as it is a three-dimensional shape such as a sphere, a hemisphere, a circular column, a square column, a cone, a pyramid, a shape of an interior region of the target shaped object and the like.

What is claimed is:

1. A three-dimensional object manufacturing method, comprising:
    providing a three-dimensional object manufacturing device, including:
        an inkjet head for forming an ink layer;
        a flattening roller for removing one part of a surface of the ink layer formed by the inkjet head to flatten the surface and adjust a thickness of the ink layer to a specific thickness; and
        a controller for layering and stacking the ink layer in which the surface is flattened by the flattening roller to manufacture a three-dimensional object;
    performing an ink ejection amount reducing step of forming an ink ejection amount reduction region in which an ejection amount of ink ejected by the inkjet head is reduced from an amount corresponding to the specific thickness in at least one part of a part corresponding to an interior of the three-dimensional object, when forming the ink layer that is specific with the inkjet head, wherein a height of the part corresponding to the interior of the three-dimensional object in a vertical direction is lower than a height of a part corresponding to a surface portion of the three-dimensional object in the vertical direction by the specific thickness; and
    performing an ink ejection amount increasing step of increasing an ejection amount of ink ejected by the inkjet head with respect to a region in which a range in an extending direction of the ink layer overlaps the ink ejection amount reduction region from an amount corresponding to the specific thickness, when forming the ink layer on an upper side of the ink layer that is specific with the inkjet head,
    wherein in at least a part of a plurality of ink layers to be layered and stacked, the ejection amount of ink is controlled so that a part corresponding to the specific thickness is in contact with the flattening roller, and a height of the part corresponding to the interior of the three-dimensional object is not in contact with the flattening roller.

2. The three-dimensional object manufacturing method according to claim 1, wherein
    the ink ejection amount reducing step is a step of forming the ink ejection amount reduction region by forming cavity data in at least one part of a part corresponding to the ink ejection amount reduction region in manufacturing data used by the three-dimensional object manufacturing device.

3. The three-dimensional object manufacturing method according to claim 1, wherein
    the three-dimensional object includes a target shaped object to be aimed,
    the target shaped object includes a color layer to be visually recognized from an outside, and
    the ink ejection amount reduction region is disposed on an inner side of the color layer in the target shaped object.

4. The three-dimensional object manufacturing method according to claim 2, wherein
    the three-dimensional object includes a target shaped object to be aimed,
    the target shaped object includes a color layer to be visually recognized from an outside, and
    the ink ejection amount reduction region is disposed on an inner side of the color layer in the target shaped object.

5. The three-dimensional object manufacturing method according to claim 1, wherein
    the three-dimensional object includes:
        a target shaped object to be aimed; and
        a support portion, having a surface in contact with the target shaped object, being formed at a periphery of the target shaped object, and configured for supporting at least one part of the target shaped object, and
    the ink ejection amount reducing step is a step of forming the ink ejection amount reduction region in at least one part of the support portion.

6. The three-dimensional object manufacturing method according to claim 2, wherein
    the three-dimensional object includes:
        a target shaped object to be aimed; and
        a support portion, having a surface in contact with the target shaped object, being formed at a periphery of the target shaped object, and configured for supporting at least one part of the target shaped object, and
    the ink ejection amount reducing step is a step of forming the ink ejection amount reduction region in at least one part of the support portion.

7. The three-dimensional object manufacturing method according to claim 1, wherein
    the ink ejection amount reducing step is a step of forming a plurality of the ink ejection amount reduction regions in the three-dimensional object in the extending direction of the ink layer.

8. The three-dimensional object manufacturing method according to claim 2, wherein
    the ink ejection amount reducing step is a step of forming a plurality of the ink ejection amount reduction regions in the three-dimensional object in the extending direction of the ink layer.

9. The three-dimensional object manufacturing method according to claim 3, wherein
    the ink ejection amount reducing step is a step of forming a plurality of the ink ejection amount reduction regions in the three-dimensional object in the extending direction of the ink layer.

10. The three-dimensional object manufacturing method according to claim 4, wherein
the ink ejection amount reducing step is a step of forming a plurality of the ink ejection amount reduction regions in the three-dimensional object in the extending direction of the ink layer.

11. The three-dimensional object manufacturing method according to claim 5, wherein
the ink ejection amount reducing step is a step of forming a plurality of the ink ejection amount reduction regions in the three-dimensional object in the extending direction of the ink layer.

12. The three-dimensional object manufacturing method according to claim 6, wherein
the ink ejection amount reducing step is a step of forming a plurality of the ink ejection amount reduction regions in the three-dimensional object in the extending direction of the ink layer.

13. A three-dimensional object manufacturing system, comprising:
a three-dimensional object manufacturing device, including:
an inkjet head for forming an ink layer;
a flattening roller for removing one part of a surface of the ink layer formed by the inkjet head to flatten the surface and adjust a thickness of the ink layer to a specific thickness; and
a controller for layering and stacking the ink layer in which the surface is flattened by the flattening roller to manufacture a three-dimensional object,
wherein the controller is configured to:
form an ink ejection amount reduction region in which an ejection amount of ink ejected by the inkjet head is reduced from an amount corresponding to the specific thickness in at least one part of a part corresponding to an interior of the three-dimensional object, when forming the ink layer that is specific with the inkjet head, wherein a height of the part corresponding to the interior of the three-dimensional object in a vertical direction is lower than a height of a part corresponding to a surface portion of the three-dimensional object in the vertical direction by the specific thickness, and
increase an ejection amount of ink ejected by the inkjet head with respect to a region in which a range in an extending direction of the ink layer overlaps the ink ejection amount reduction region from an amount corresponding to the specific thickness, when forming the ink layer on an upper side of the ink layer that is specific with the inkjet head,
wherein in at least a part of a plurality of ink layers to be layered and stacked, the ejection amount of ink is controlled so that a part corresponding to the specific thickness is in contact with the flattening roller, and a height of the part corresponding to the interior of the three-dimensional object is not in contact with the flattening roller.

* * * * *